United States Patent
Jin et al.

(10) Patent No.: US 11,449,745 B2
(45) Date of Patent: Sep. 20, 2022

(54) OPERATION APPARATUS AND METHOD FOR CONVOLUTIONAL NEURAL NETWORK

(71) Applicant: SK hynix Inc., Gyeonggi-do (KR)

(72) Inventors: Young-Jae Jin, Seoul (KR);
Young-Suk Moon, Gyeonggi-do (KR);
Hong-Sik Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 1390 days.

(21) Appl. No.: 15/618,683

(22) Filed: Jun. 9, 2017

(65) Prior Publication Data
US 2018/0089562 A1 Mar. 29, 2018

(30) Foreign Application Priority Data
Sep. 28, 2016 (KR) .................. 10-2016-0124574

(51) Int. Cl.
*G06N 3/08* (2006.01)
*G06F 17/15* (2006.01)
(Continued)

(52) U.S. Cl.
CPC ............... *G06N 3/08* (2013.01); *G06F 7/501* (2013.01); *G06F 7/523* (2013.01); *G06F 7/5443* (2013.01); *G06F 17/15* (2013.01); *G06F 17/18* (2013.01); *G06N 3/04* (2013.01); *G06N 3/0454* (2013.01); *G06N 3/063* (2013.01); *G06N 3/082* (2013.01); *G06F 2207/4824* (2013.01)

(58) Field of Classification Search
CPC .......... G06N 3/08; G06N 3/04; G06N 3/0454; G06N 3/063; G06N 3/082; G06F 7/501; G06F 7/523; G06F 7/5443; G06F 17/15; G06F 17/18; G06F 2207/4824
See application file for complete search history.

(56) References Cited

U.S. PATENT DOCUMENTS 5,909,562 A   6/1999   Faget et al.
8,111,633 B1  2/2012   Aggarwal et al.
(Continued)

FOREIGN PATENT DOCUMENTS

CN    1637716 A    7/2005
CN    101221542 A  7/2008
(Continued)

OTHER PUBLICATIONS

Srimat Chakradhar, Murugan Sankaradas, Venkata Jakkula, Srihari Cadambi, "A dynamically configurable coprocessor for convolution neural networks", NEC Laboratories, ISCA'10 Jun. 19-23, 2010. pp. 247-257. (Year: 2010).*

(Continued)

*Primary Examiner* — Brian M Smith
(74) *Attorney, Agent, or Firm* — IP & T Group LLP

(57) ABSTRACT

Disclosed herein is a convolutional neural network (CNN) operation apparatus, including at least one channel hardware set suitable for performing a feature extraction layer operation and a classification layer operation based on input data and weight data, and a controller coupled to the channel hardware set. The controller may control the channel hardware set to perform the feature extraction layer operation and perform a classification layer operation when the feature extraction layer operation is completed.

24 Claims, 20 Drawing Sheets

(51) Int. Cl.
*G06F 7/544* (2006.01)
*G06N 3/063* (2006.01)
*G06N 3/04* (2006.01)
*G06F 7/501* (2006.01)
*G06F 7/523* (2006.01)
*G06F 17/18* (2006.01)

(56) References Cited

U.S. PATENT DOCUMENTS

| | | | |
|---|---|---|---|
| 10,074,051 B2* | 9/2018 | Thorson | G06N 3/063 |
| 2013/0103869 A1* | 4/2013 | Koido | G06F 13/4291 |
| | | | 710/110 |
| 2016/0093343 A1* | 3/2016 | Ovsiannikov | G11C 7/1039 |
| | | | 365/189.02 |
| 2016/0379109 A1* | 12/2016 | Chung | G06F 15/7803 |
| | | | 706/26 |
| 2017/0011288 A1* | 1/2017 | Brothers | G06F 9/3017 |
| 2017/0317983 A1* | 11/2017 | Kompalli | G06F 21/6209 |
| 2018/0032312 A1* | 2/2018 | Hansen | G06F 7/5443 |
| 2018/0137294 A1* | 5/2018 | Van Antwerpen | |
| | | | G06F 13/1605 |
| 2019/0065940 A1* | 2/2019 | Ross | G06F 15/8046 |
| 2019/0180409 A1* | 6/2019 | Moloney | G01C 21/20 |

FOREIGN PATENT DOCUMENTS

| | | |
|---|---|---|
| CN | 101266463 A | 9/2008 |
| CN | 104145281 A | 11/2014 |
| CN | 104915322 A | 9/2015 |
| CN | 105279439 A | 1/2016 |
| CN | 105488565 A | 4/2016 |
| CN | 105678379 A | 6/2016 |
| CN | 105681628 A | 6/2016 |
| KR | 1020160069834 | 6/2016 |
| WO | 8804075 A1 | 6/1988 |

OTHER PUBLICATIONS

Gokhale, V.A., "Nn-X—a hardware accelerator for convolutional neural networks," Open Access Thesis. 722. (2014) pp. i-viii and 1-44. (Year: 2014).*

Dundar, A. et al., "Embedded streaming deep neural networks accelerator with applications," IEEE. Trans on Neural Networks and Learning Systems, vol. 28, No. 7, Jul. 2017 (avail, online Apr. 8, 2016) pp. 1572-1583. (Year: 2016).*

Office Action issued by the Chinese Patent Office dated Feb. 20, 2021.

Karpathy, A., CS231n Convolutional Neural Networks for Visual Recognition, Reference material from cs231n.github.io/convolutional-networks/.

R. Al-Haddad et al., Sustainable Modular Adaptive Redundancy Technique Emphasizing Partial Reconfiguration for Reduced Power Consumption, International Journal of Reconfigurable Computing, 2011, p. 1-25, vol. 2011, Article ID 430808, Hindawi Publishing Corporation.

Yang Haibo et al., Middle and Low Level Image Processing Based on Register Optimising, Journal of Image and Graphics, Jun. 1999, p. 450-453, vol. 4(A), No. 6, Department of Information and Electronic Engineering, Zhejiang University, Hangzhou, Republic of China.

Office Action issued by the Chinese Patent Office dated Oct. 12, 2021.

* cited by examiner

Input data set of CI reg : | input data[n-1] | ... | i.data[0] | Z_F | CO_id | PO_id | L_id |

911  Input data set of CI reg : | input data[n-1] | ... | i.data[0] | Z_F | CO_id | PO_id | L_id |

913  Weight data set of Weight reg : | weight[n-1] | ... | weight[0] | Z_F | K_id |

915  Result data set of PE : | result[n-1] | ... | result[0] | Z_F | CO_id | PO_id | L_id | K_id |

931  Result data set A of PE : | result[n-1] | ... | result[0] | Z_F | CO_id | PO_id | L_id | K_id |

933  Result data set B of PE : | result[n-1] | ... | result[0] | Z_F | CO_id | PO_id | L_id | K_id |

ADD

935  Result data set B of ADD : | result[n-1] | ... | result[0] | Z_F | CO_id | PO_id | L_id | K_id |

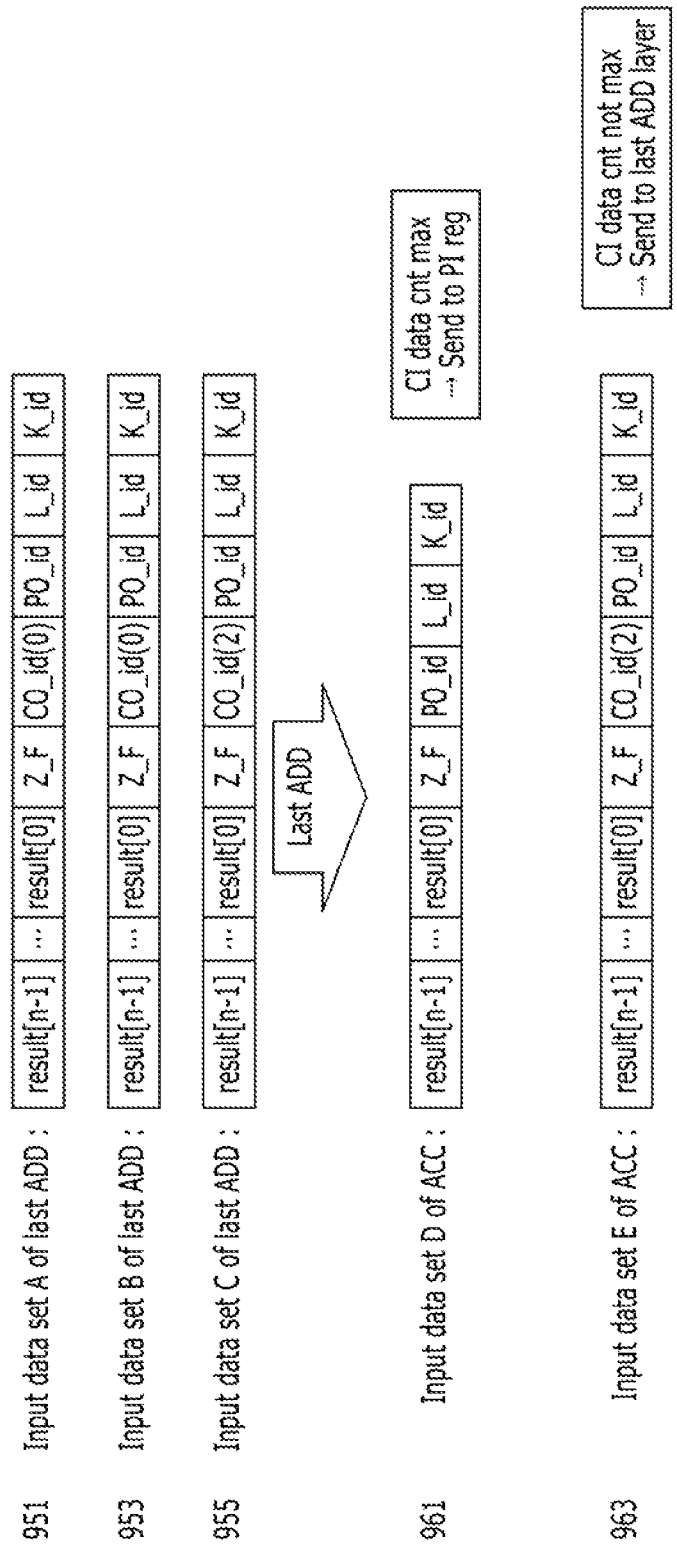

FIG. 10

Pooling Input data set D : | result[n-1] | ... | result[0] | Z_F | PO_id | L_id | K_id |

FIG. 11

1111  LO reg input data set D : | result[n-1] | ... | result[0] | Z_F | L_id | K_id |

⬇ Activate function LUT

1113  CI reg(next layer) input data set D : | result[n-1] | ... | result[0] | Z_F |

FIG. 12

1211  FC layer input data set D : | input data[n-1] | ... | i.data[0] | Z_F | L_id |
1213  FC layer weight data set D : | weight[n-1] | ... | weight[0] | Z_F | K_id |
1215  FC layer result data set D : | result[n-1] | ... | result[0] | Z_F | L_id | K_id |

FIG. 13

FC layer LO reg result data set D : | result[n-1] | ... | result[0] |

OPERATION APPARATUS AND METHOD FOR CONVOLUTIONAL NEURAL NETWORK

CROSS-REFERENCE TO RELATED APPLICATION

The present application claims priority of Korean Patent Application No. 10-2016-0124574, filed on Sep. 28, 2016, which is incorporated herein by reference in its entirety.

BACKGROUND

1. Field

Exemplary embodiments of the present invention relate to an operation apparatus and method for a convolutional neural network.

2. Description of the Related Art

A deep learning algorithm is an operation having a lot of simple calculations (e.g., additions and multiplications) and may be usefully used to analyze big data and to discover hidden features within a data set. Deep learning may be defined as a set of machine learning algorithms which attempt a high level of abstractions (i.e., a task for summarizing core contents or functions in a large amount of data or complicated data) through a combination of several non-linear transform schemes.

The deep learning algorithm may be divided into a training operation and a test operation. The training operation may be a series of processes for learning features from an input data set. In the training process, parameters, such as weight, features and/or a kernel, may be learnt. The test operation may be performed using the trained parameters. In the deep learning algorithm, a task for properly classifying input, such as a format (e.g., in the case of an image, front and rear appearances of the same type of subjects (e.g., cats or vehicles)) different from an input data set for training may be performed in a test.

The deep learning algorithm may be implemented using a variety of types of algorithms, such as a deep neural network (DNN), a convolutional neural network (CNN), a recurrent neural network (RNN) and a deep belief network (DBN).

The deep learning algorithm may have great power consumption and a long execution time if it is implemented in such a manner that a large amount of simple calculation is repeated in the sequential calculation method of a computer. A method using a processor (e.g., a central processing unit (CPU) or a graphic processor unit (GPU)) optimized for parallel calculation may be suitable for the deep learning algorithm in terms of performance. But the method using the processor may have great power consumption and may have complicated software coding for parallel calculation whenever the algorithm is changed. The method for performing the deep learning algorithm using the processor may have a slower operating speed and greater power consumption compared to a method performed through a hardware configuration.

SUMMARY

Various embodiments are directed to a convolution neural network (CNN) operation apparatus and a method which are capable of performing a deep learning algorithm.

Various embodiments propose an apparatus and a method for performing a test operation on a convolution neural network (CNN) algorithm, wherein convolution operation is performed on trained weight data and input data.

Various embodiments of the present invention propose a convolution neural network (CNN) operation apparatus and a method which are capable of improving parallelism between a convolution operation and a pooling operation and reducing operation latency by performing a convolution operation using a pre-computed memory map for the mapping of input data and weight data.

Various embodiments of the present invention propose a convolution neural network (CNN) operation apparatus and a method which are capable of reducing a convolution operation time by passing a convolution operation if an operand is 0.

Various embodiments of the present invention propose a convolution neural network (CNN) operation apparatus and a method which are capable of reducing multiplication delay attributable to memory load latency by prefetching weight data for convolution operation and performing convolution using the prefetched weight data when performing a convolution operation.

Various embodiments of the present invention propose a convolution neural network (CNN) operation apparatus and a method which are capable of performing a drop-out operation for improving the complexity of convolution operation.

In various embodiments of the present invention, a convolution neural network (CNN) operation apparatus may include at least one channel hardware set suitable for performing a feature extraction layer operation and a classification layer operation based on input data and weight data, and a controller coupled to the channel hardware set. The CNN control unit may control the channel hardware set to perform the feature extraction layer operation and perform a classification layer operation when the feature extraction layer operation is completed.

In various embodiments of the present invention, an operating method of a convolutional neural network (CNN) may include performing a feature extraction layer operation by activating a convolution block and a pooling block of at least one channel hardware set and performing a classification layer operation by activating the convolution block of the channel hardware set when the feature extraction layer operation is completed.

BRIEF DESCRIPTION OF THE DRAWINGS

The above and other features and advantages of the present invention will become more apparent to those skilled in the art to which the present invention pertains by the following detailed description with reference to the attached drawings in which:

FIGS. 9A to 9C are diagrams showing exemplary architectures of an input data set, a weight data set and a result data set of a convolution block, in accordance with various embodiments of the present invention.

FIG. 10 is a diagram showing an exemplary architecture input data in a pooling operation of a convolution neural network (CNN) operation apparatus, in accordance with various embodiments of the present invention.

FIG. 11 is a diagram showing an exemplary architecture of output data and activated data in a pooling block of a convolution neural network (CNN) operation apparatus, in accordance with various embodiments of the present invention.

FIG. 12 is a diagram showing an exemplary architecture of input and output data of a convolution block in a classification layer of a convolution neural network (CNN) operation apparatus, in accordance with various embodiments of the present invention.

FIG. 13 is a diagram showing an exemplary architecture of layer output data in a convolution neural network (CNN) operation apparatus, in accordance with various embodiments of the present invention.

DETAILED DESCRIPTION

Figure 1:
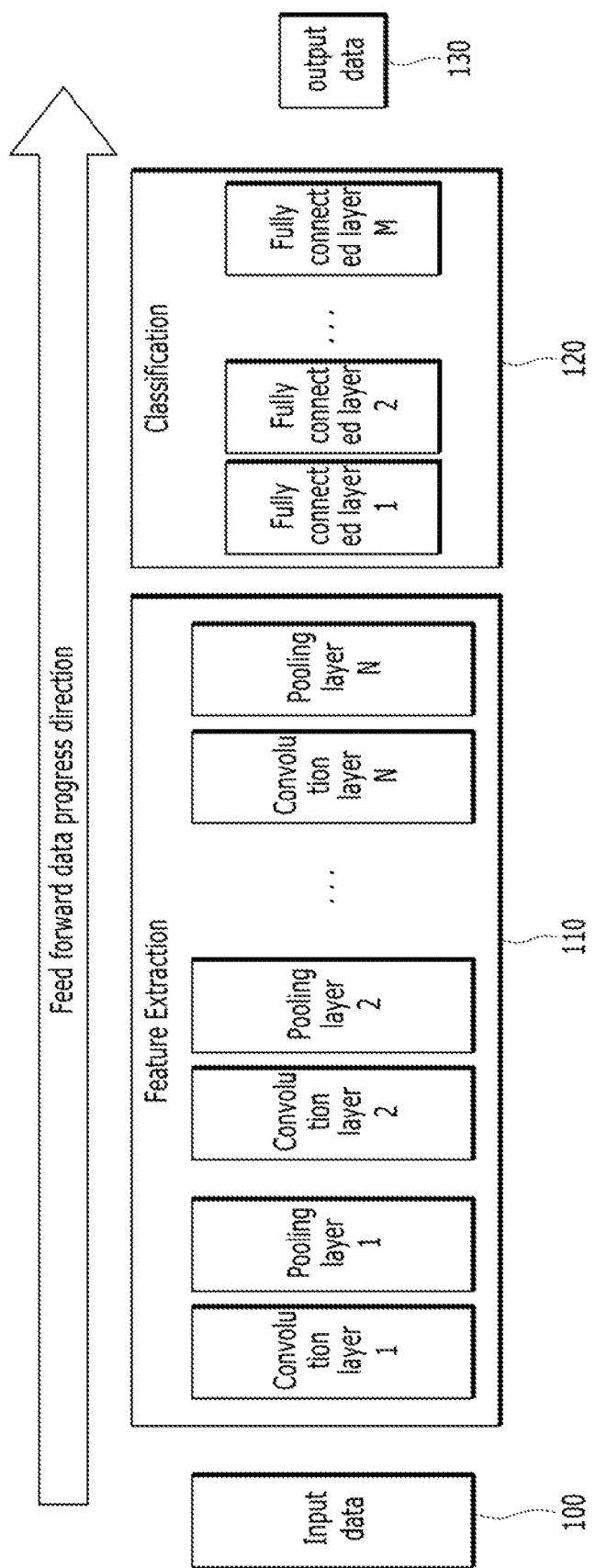
FIG. 1 is a diagram showing an architecture of a convolution neural network (CNN) feedforward algorithm.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

A deep learning algorithm can analyze big data by performing a simple calculation (e.g., addition and multiplication) and can discover hidden features within a data set. If the deep learning algorithm is implemented in such a manner that the simple calculation is repeated by a sequential calculation method of a computer, then the deep learning algorithm may have a high power consumption and a long execution time. Various embodiments of the present invention propose a hardware architecture capable of improved processing of a deep learning algorithm.

Various embodiments of the present invention are directed to the architecture and operation of convolution neural network (CNN) hardware, which are capable of executing a deep learning algorithm by performing a convolution operation on the weight set and input data of a learnt algorithm.

In accordance with an embodiment, the CNN hardware architecture can receive input data using a pre-computed memory map without sequentially inputting the input data. The CNN hardware architecture can improve parallelism between a convolution operation and a pooling operation and reduce operation latency by inputting the input data in a non-sequential manner with reference to a pre-computed memory map without sequentially fetching the input data.

In accordance with an embodiment, a CNN hardware architecture is provided that can reduce the time taken to perform a convolution operation and a pooling operation by controlling the convolution operation so that a convolution computation operation is not performed (i.e., zero passing) if an operand (e.g., input data or weight data) is 0.

In accordance with an embodiment, the CNN hardware architecture can perform a convolution computation operation by prefetching weight data in a deep learning algorithm and using the prefetched weight data when performing a convolution computation operation. That is, the CNN hardware architecture can reduce a convolution operation time (reduce multiplication delay attributable to memory load latency upon convolution operation) by prefetching weight data to be used from the start of a layer to the end of the layer in a block on which a convolution operation is performed.

In accordance with an embodiment, the CNN architecture can reduce an operation latency using a drop-out method, e.g., a drop-out method, that is, a regularization method, for improving performance of an algorithm in a fully connected layer.

Various embodiments of the present invention are described in more detail below with reference to the accompanying drawings.

FIG. 1 is a diagram showing an exemplary architecture of a feedforward algorithm of a convolution neural network (CNN).

Referring to FIG. 1, the CNN may include a feature extraction part 110 and a classification part 120. The feature extraction part 110 may include a configuration in which a pair of convolution layer and a pooling layer is repeated multiple times, for example, N times. The classification part 120 may include at least one fully connected layer. As illustrated in FIG. 1, the classification part 120 may include M fully connected layers. The feature extraction part 110 may include an architecture in which output data processed by a pair of a convolution layer and a pooling layer becomes the input data of a next pair of a convolution layer and a pooling layer. For example, external input data 100 may become the input data of the first convolution layer of the feature extraction part 110, and data processed and output by the first convolution layer may become the input data of the first pooling layer. Furthermore, data processed by the first pooling layer may become the input data of a second convolution layer, that is, one of a next pair. A convolution operation and a pooling operation may be performed by the number of times (e.g., N times) set in a host. Data output by a pooling layer of the last pair, may be fed to the first fully connected layer of the classification part 120.

The classification part 120 may include at least one fully connected layer. The classification part 120 may perform a predetermined number of operations of a fully connected layer, and data output by the classification part 120 may become output data (or training data) 130.

Figure 2A:
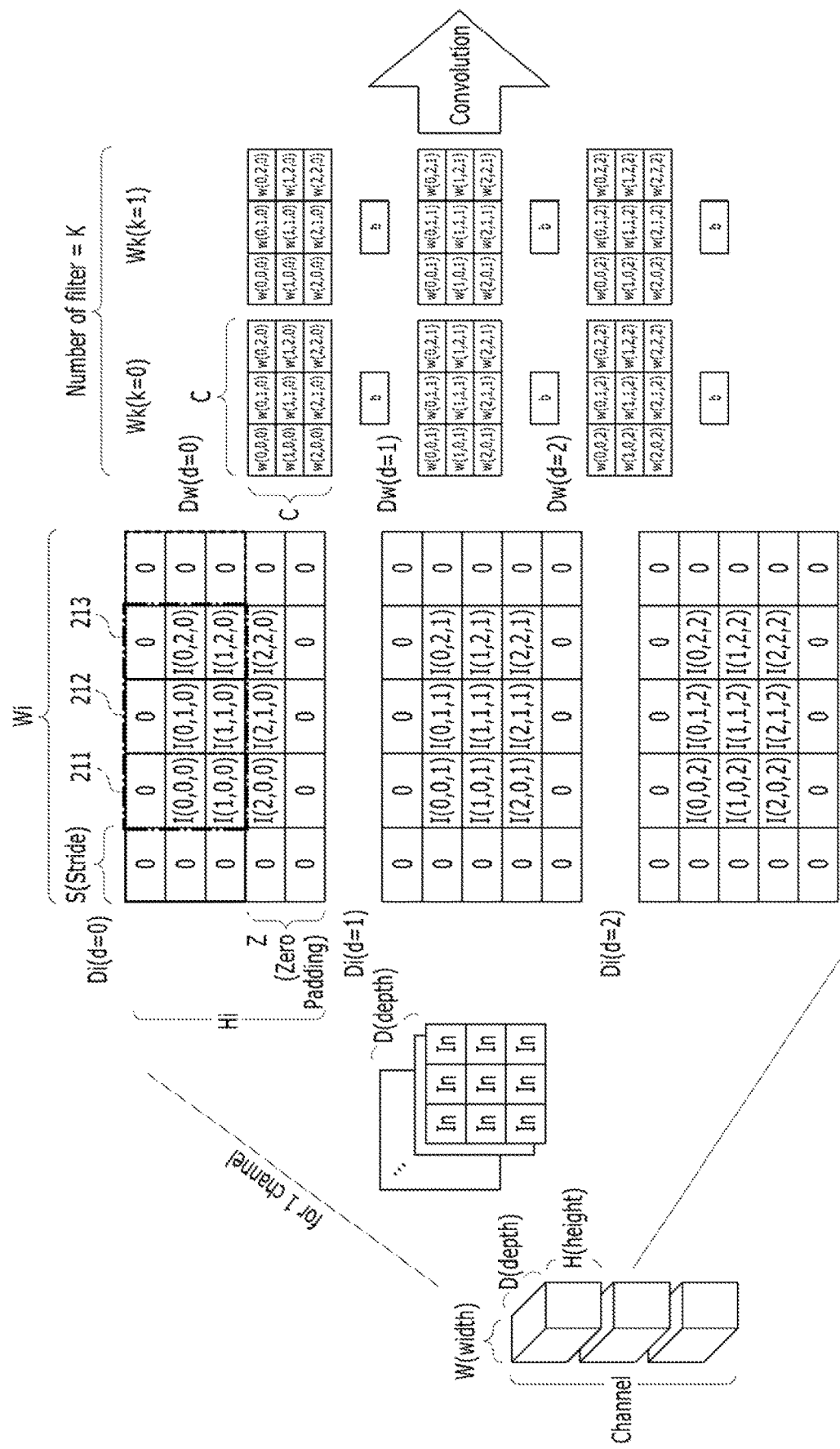
FIGS. 2A and 2B are diagrams illustrating a feed forward path flow of a convolution neural network (CNN).
Figure 2B:
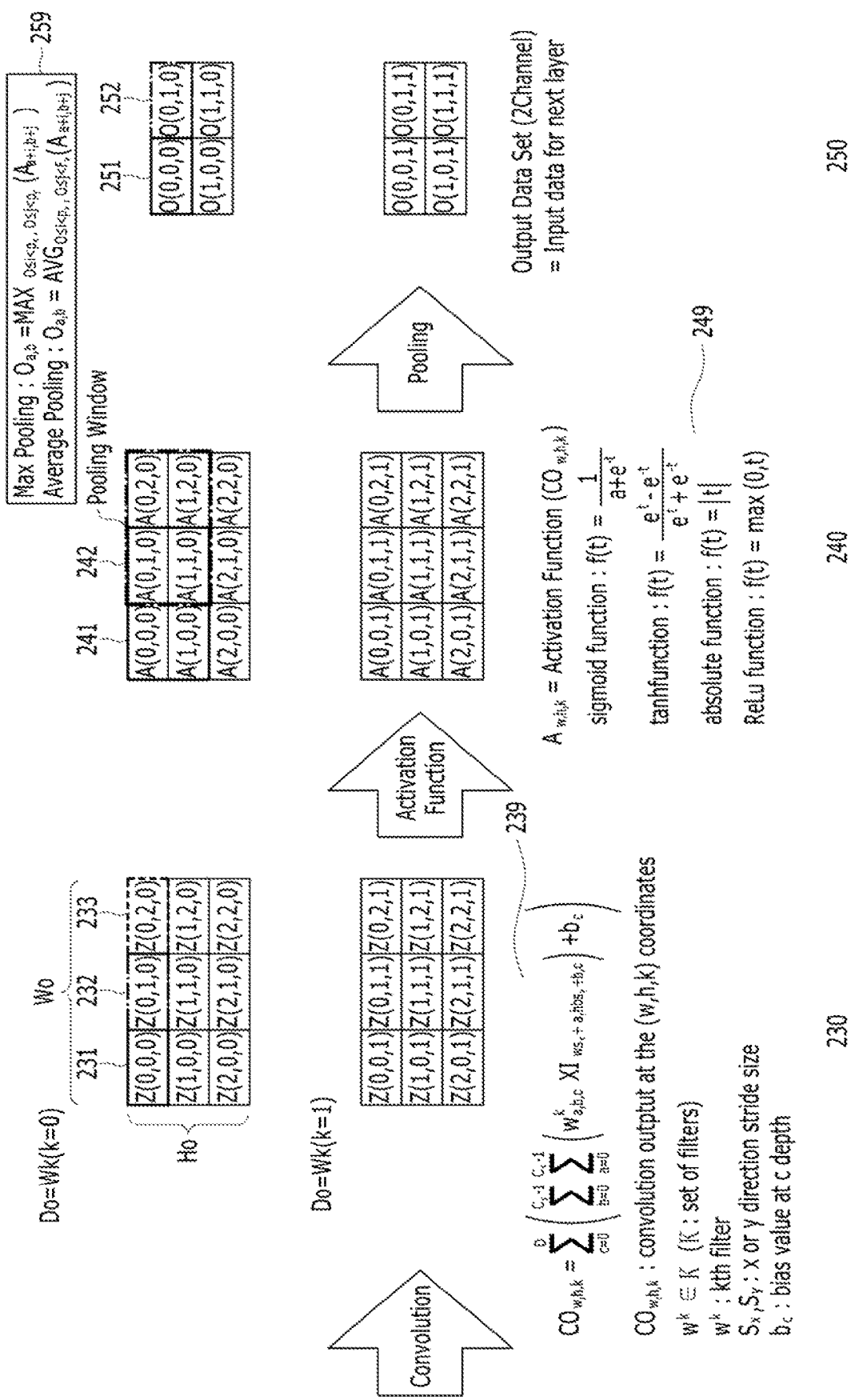

FIGS. 2A and 2B are diagrams for illustrating a feedforward path flow of a convolution neural network (CNN). For the purpose of illustration, FIGS. 2A and 2B show an example of data processed by a pair of a convolution layer and a pooling layer in order to describe the CNN feedforward algorithm.

Referring to FIG. 2A, input data 200 on the leftmost side may include a plurality of channels. FIG. 2 shows an example in which the input data 200 includes three channels. The input data 200 may be expressed in width, height and depth. Details of input data 210 with one channel are shown in terms of width, height and length. In FIGS. 2A and 2B, 210 to 240 show an example of data processed by a convolution operation and pooling operation with respect to data inputted to one channel. Data inputted to other channels may be processed using the same method. Input data 200 may be zero-padded in order to comply with the size of a convolution window. Zero padding may mean that 0 is inserted into the edge of the input data 210.

A convolution layer may perform a convolution operation on two weight sets 220 having a size of C×C×D and each of the input data 210. The convolution operation may calculate data that belongs to input data and weight data that has the same input depth and weight depth. For example, the convolution operation may multiply and add all of the weight elements at the same position as elements corresponding to the position of the convolution window 211 Dw (d=0,1,2) of input data 210. A convolution operation may be identically performed on all of depths Di (d=0,1,2). If the sums of the products of 3 are added, the added result is located at Z(0,0,0) corresponding to "231" of the output (Wo×Ho×Do) of the convolution layer 220. A related relation may be an equation for calculating an activation function Aw,h,k in FIG. 2B. The weight set may also be called a filter. An output data depth corresponding to the number of filters may be determined. Such a method may be identically performed on a convolution window (e.g., all of convolution windows including convolution windows 211-213 of FIG. 2A). In FIG. 2B, "239" shows an example in which the convolution operation is expressed in equation.

When the convolution operation is performed, output data, such as data 230 of FIG. 2B, may be generated. When the convolution operation is terminated, the output data may be computed as an activation value through one of activation functions 240. In FIG. 2B, "249" shows an example in which an activation function is expressed in equation. An activation output value may become the input data of the pooling layer 250. A pooling operation may be an operation for selecting a maximum value of the values of a plurality of input data that enters a pooling window, such as a polling window 241 or 242 in FIG. 2B, or calculating an average value of the plurality of input data. Such maximum values or average values may be compressed into one value, such as 251 or 252. In FIG. 2B, "259" shows an example in which the pooling operation is expressed in equation.

A convolution operation and a pooling operation may be performed on other channel data of the same input data according to the same procedure as that shown in FIGS. 2A and 2B. A weight value or the number of filters may be different for each channel and each layer. The output data of the pooling operation may become the input data of a next layer (i.e., a next convolution layer in FIG. 1). In this case, the number of weight sets, that is, the number of filters, may become the number of channels of input data for a next layer.

The CNN operation apparatus in accordance with various embodiments of the present invention may provide a new apparatus and method capable of performing a convolution neural network (CNN) feedforward algorithm, such as that shown in FIGS. 1 and 2.

Figure 3:
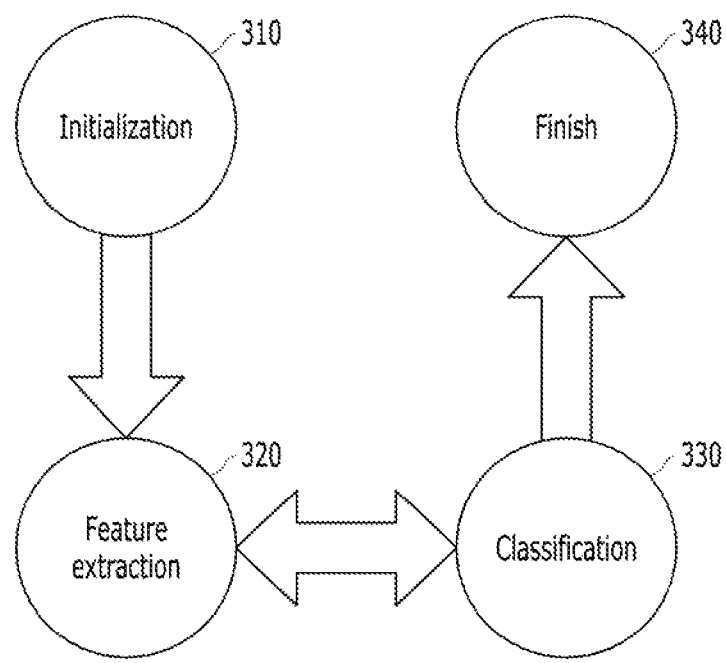
FIG. 3 is a diagram showing an operating procedure of a convolution neural network (CNN) operation apparatus, in accordance with various embodiments of the present invention.

FIG. 3 is a diagram showing the operating procedure of a convolution neural network (CNN) operation apparatus in accordance with various embodiments of the present invention.

Referring to FIG. 3, in an initialization operation 310, the CNN operation apparatus may receive and store pieces of information for executing a CNN algorithm. The pieces of received information may become weight data. Furthermore, the CNN operation apparatus may further receive and store at least one of layer configuration information, an address map for convolution input (or a pre-computed memory map) and an activation function look-up table (LUT). After performing the initialization operation 310, the CNN operation apparatus may perform a feature extraction operation 320. The feature extraction operation 320 may become a convolution operation and a pooling operation. The convolution operation and the pooling operation may be performed according to a method and procedure, such as those shown in FIGS. 1 to 2B. When completing the feature extraction operation 320 for the input data, the CNN operation apparatus may perform a classification operation 330. The classification operation 330 may include at least one fully connected layer as shown in FIG. 1. When completing the classification operation 330, the CNN operation apparatus may output data to the outside of a system in a finish operation 340.

Figure 4A:
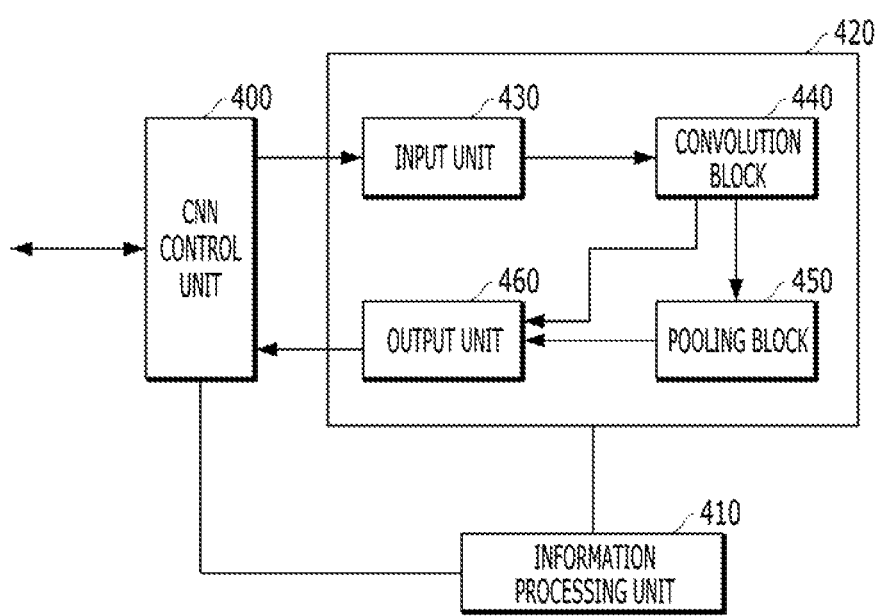
FIGS. 4A and 4B are block diagrams showing exemplary configurations of a convolution neural network (CNN) operation apparatus, in accordance with various embodiments of the present invention.

FIG. 4A is a block diagram showing an exemplary configuration of a convolution neural network (CNN) operation apparatus, in accordance with various embodiments of the present invention.

Referring to FIG. 4A, the CNN operation apparatus may include a CNN control unit 400, an information processing unit 410 and a channel hardware set 420. A single channel hardware set 420 or a plurality of two or more channel hardware sets 420 may be implemented in the CNN operation apparatus.

The CNN control unit 400 may execute a feature extraction layer and a classification layer, and may perform an operation for remapping input data when executing the operation of a corresponding layer. The CNN control unit 400 may include an arbiter or a memory management unit (MMU).

The information processing unit 410 may include at least one register and at least one counter. For example, the information processing unit 410 may include a weight register for storing weight data which may be used in the convolution operation of the channel hardware set 420. For example, the information processing unit 410 may include counters for updating the number of operations by the CNN operation apparatus. When a system is initialized, the information processing unit 410 may store pieces of information, received from a host, in corresponding registers and update a count value according to an operation of the CNN operation apparatus.

A plurality of the channel hardware sets 420 may be configured in the CNN operation apparatus. Each of the channel hardware sets 420 may execute a feature extraction layer operation and a classification layer operation. Each of the channel hardware sets 420 may execute a feature extraction layer operation on the input data of corresponding channels. When completing the feature extraction layer operation, each of the channel hardware sets 420 may execute the operation of a classification layer.

Each of the channel hardware sets 420 may include an input unit 430, a convolution block 440, a pooling block 450 and an output unit 460.

The input unit 430 may include an input register for storing input data remapped by the CNN control unit 400. The input unit 430 may include a convolution input (CI) register (CI-reg) for storing input data of a feature extraction layer and a fully connected input register (FCI-reg) for storing input data of a fully connected layer.

The convolution block 440 may perform a convolution operation on input data stored in the input unit 430 and the weight data of the information processing unit 410 and may sum the products of the data on which the convolution operation has been performed. The convolution block 440 may perform convolution operation on weight data having the same identification (ID) as input data.

The pooling block 450 may perform a pooling operation on data that belongs to data convolution-computed in a specific extraction layer having the same ID. The pooling block 450 may select a maximum value of the values of the data on which the convolution operation has been performed or calculate an average value of the data on which the convolution operation has been performed. The pooling block 450 may not operate in a classification layer.

The output unit 460 may store data outputted by the pooling block 450 in a feature extraction layer and may store data outputted by the convolution block 440 in a classification layer. The output unit 460 may include a layer output register (LO-reg) and an activation block.

The CNN control unit 400 of the CNN operation apparatus having the above configuration may remap external input data when executing a first feature extraction layer and may store the remapped data in the input unit 430. When executing feature extraction layers subsequent to the first feature extraction layer, the CNN control unit 400 may remap the output data output by the output unit 460 and store the remapped data in the input unit 430. When the feature extraction layer operation is terminated (when a predetermined number of feature extraction operations are terminated), the CNN control unit 400 may execute a classification layer. The CNN control unit 400 may remap output data computed in a convolution layer in the classification layer, and may store the remapped data in the input unit 430 as the input data of the fully connected layer. When terminating the execution of the classification layer, the CNN control unit 400 may output the resulting data to an external system.

As described above, the CNN operation apparatus in FIG. 4A may include the information processing unit 410 configured to comprise a register for storing weight data, the at least one channel hardware set 420 configured to execute a feature extraction layer operation and a classification layer operation, and the CNN control unit 400 configured to perform control so that each channel hardware set executes a feature extraction layer operation and executes a classification layer operation when the feature extraction layer operation is completed. Furthermore, each of the channel hardware sets 420 may include the input unit 430 for storing input data, the convolution block 440 for performing convolution operation on the input data and weight data, the pooling block 450 for performing pooling operation on convolution-computed data and the output unit 460 for storing the data on which the convolution operation has been performed or the data on which the pooling operation has been performed. The CNN operation apparatus may execute the operation of a convolution layer and the operation of a pooling layer by driving the convolution block 440 and pooling block 450 of the channel hardware set 420 in the feature extraction layer operation. When terminating the feature extraction layer operation, the CNN operation apparatus may execute the operation of a classification layer. In the operation of the classification layer, the CNN operation apparatus may execute the operation of a fully connected layer by driving the convolution block of the channel hardware set 420 (at this time the pooling block 450 is not driven).

Figure 4B:
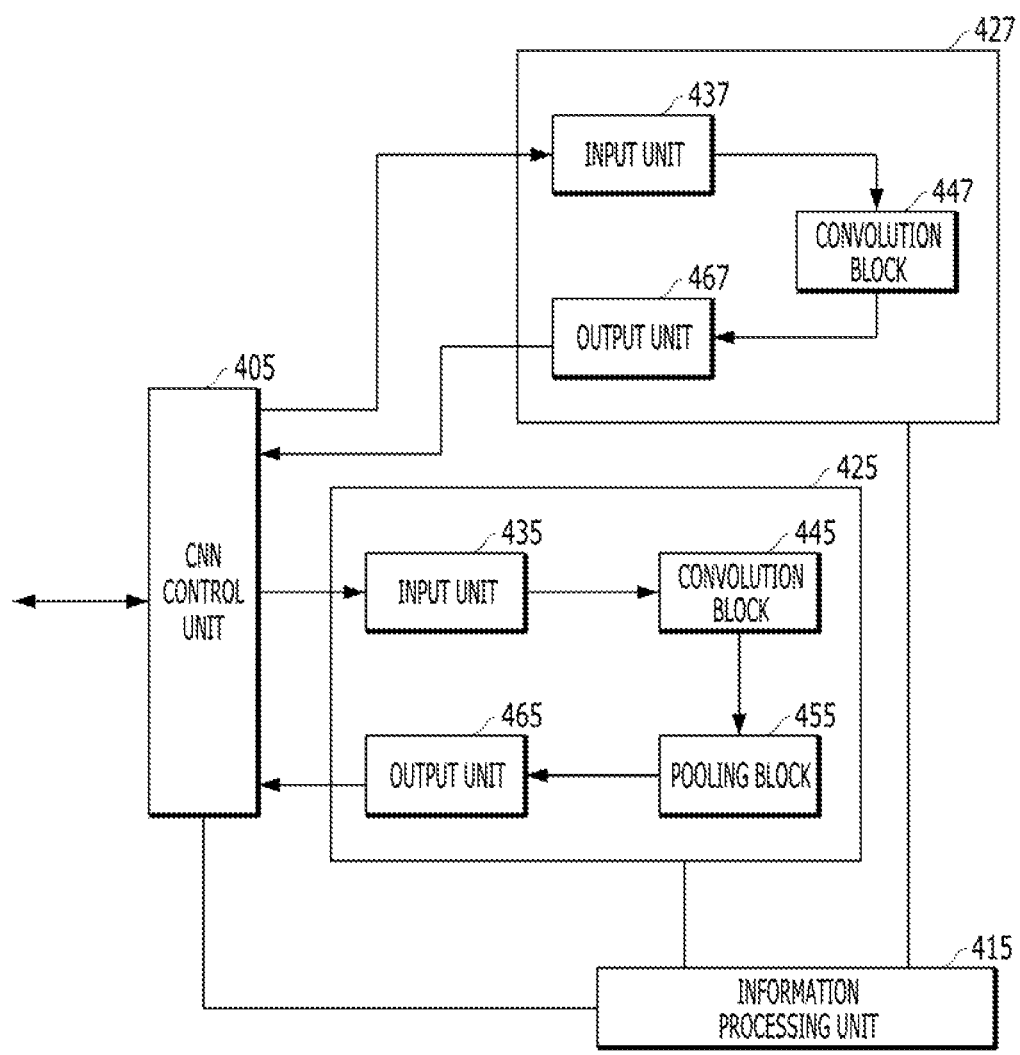

FIG. 4B is a block diagram showing another exemplary configuration of a convolution neural network (CNN) operation apparatus, in accordance with various embodiments of the present invention.

Referring to FIG. 4B, the CNN operation apparatus may include a CNN control unit 405, an information processing unit 415, a feature extraction layer block 425 and a classification layer block 427. A single or a plurality of feature extraction layer blocks 425 may be implemented in the CNN operation apparatus.

The CNN control unit 405 may control the operations of the feature extraction layer block 425 and the classification layer block 427. The CNN control unit 405 may execute an operation for remapping input data when executing the operation of a corresponding layer. The CNN control unit 405 may control the operation of the feature extraction layer block 425, and may control the operation of the classification layer block 427 when the operation of the feature extraction layer block 425 is completed. The CNN control unit 405 may include an arbiter or a memory management unit (MMU).

The information processing unit 415 may include at least one register and at least one counter. For example, the information processing unit 415 may include a weight register for storing weight data for convolution operation in the feature extraction layer block 425 and the classification layer block 427. For example, the information processing unit 415 may include counters for updating the number of computation operations performed in the CNN operation apparatus. When a system is initialized, the information processing unit 415 may store pieces of information, received from a host, in corresponding registers, and may update a count value according to an operation of the CNN operation apparatus.

A plurality of the feature extraction layer blocks 425 may be configured in the CNN operation apparatus. Each of the feature extraction layer blocks 425 may execute a feature extraction layer operation for each corresponding channel data. Each of the feature extraction layer blocks 425 may include an input unit 435, a convolution block 445, a pooling block 455 and an output unit 465.

The classification layer block 427 may include a single or a plurality of classification layers. The classification layer block 427 may execute a classification layer operation on data on which the feature extraction layer operation has been completed. The feature extraction layer block 427 may include an input unit 437, a convolution block 447 and an output unit 467.

In the CNN operation apparatus having a configuration, such as that described above, when first executing a feature extraction layer operation, the CNN control unit 405 may store data, received from an external system, in the input unit 435 of the feature extraction layer block 425. When executing feature extraction layers subsequent to the first feature extraction layer, the CNN control unit 405 may remap the output data of the pooling block 455 stored in the output unit 465 and may store the remapped data in the input unit 435 as convolution input data. When the feature extraction layer operation is terminated, the CNN control unit 405 may execute the classification layer block 427. The classification layer block 427 may remap output data computed by the convolution block 447 and may store the remapped data in the input unit 437 as the input data of a fully connected layer. When the classification layer operation is terminated, the CNN control unit 405 may output the resulting data to an external system.

Figure 5:
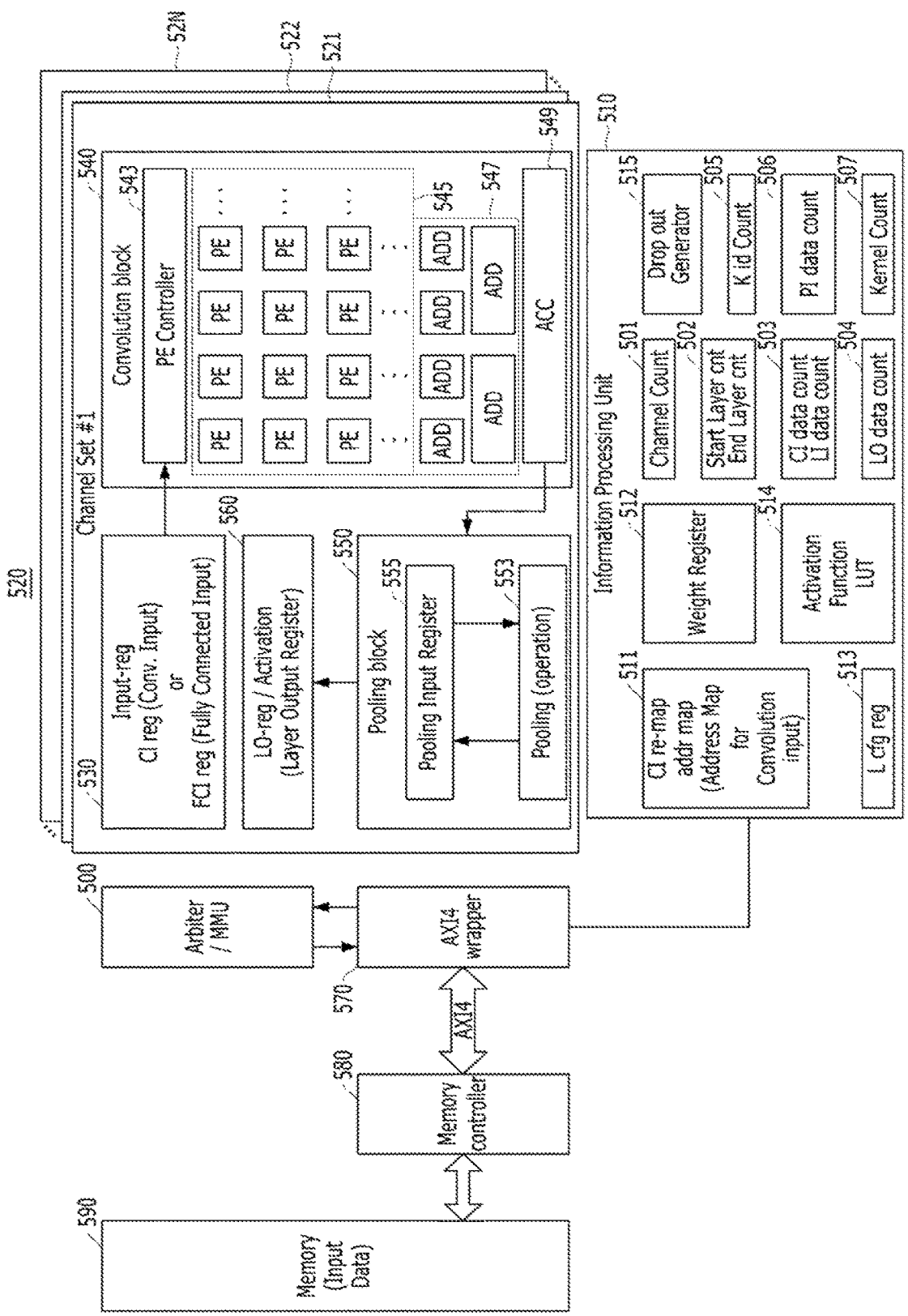
FIG. 5 is a diagram showing an exemplary configuration of a convolution neural network (CNN) system, in accordance with various embodiments of the present invention.

FIG. 5 is a diagram showing a convolution neural network (CNN) system, in accordance with various embodiments of the present invention.

Referring to FIG. 5, the CNN system may include a CNN control unit 500, an information processing unit 510, at least one channel hardware set 520, a memory 590, a memory controller 580 and a wrapper 570. Each of the channel hardware sets 520 may include an input unit 530, a convolution block 540, a pooling block 550 and an output unit 560. In the following description, the CNN operation apparatus may be an apparatus including the CNN control unit 500, the information processing unit 510, the input unit 530, the convolution block 540, the pooling block 550 and the output unit 560. A CNN system may mean a system including the CNN operation apparatus and an external device (e.g., a memory and a memory controller). Furthermore, in FIG. 5, the CNN control unit 500, the information processing unit 510 and the channel hardware set 520 may be the same as the CNN control unit 400, information processing unit 410 and channel hardware set 420 of FIG. 4A, respectively. The input unit 530, convolution block 540, pooling block 550 and output unit 560 of the channel hardware set 520 shown in FIG. 5 may have the same configuration and operation as the input unit 430, convolution block 440, pooling block 450 and output unit 460 of the channel hardware set 420 shown in FIG. 4A, respectively.

The memory 590 may store data on which a deep learning algorithm will be performed. The memory controller 580 may control the read and write operation of the memory 590 and provide input data to the CNN operation apparatus. The memory controller 580 may communicate data with the external system (e.g., a host). The wrapper 570 may perform a data interface operation for the memory controller 580 along with the CNN operation apparatus. For example, when the system is initialized, the memory controller 580 may receive information (e.g., weight data, an address map, layer configuration information, a look-up table and/or drop-out information) for performing a deep learning algorithm from the host, and may store the information in a corresponding register of the information processing unit 510 through the wrapper 570. Furthermore, the CNN control unit 500 may receive information (e.g., an address map) stored in the information processing unit 510 through the wrapper 570.

The CNN control unit 500 may include an arbiter or a memory management unit (MMU). The information processing unit 510 may include a plurality of registers and counters. The information processing unit 510 may include an address map register (a convolution input (CI) re-map address map or an address map for CI) 511 for remapping input data, a weight register 512 for convolution operation, a layer configuration register (L cfg reg) 513, an activation function look-up table (LUT) 514 and a drop-out generator 515. The address map register 511, weight register 512, layer configuration register 513, activation function LUT 514 and drop-out generator 515 of the information processing unit 510 may receive corresponding data through the external system (e.g., the host) when the system is initialized and may store the received data.

The input unit 530 may include an input register for storing input data remapped by the CNN control unit 500 based on the address map register 511. The input unit 530 may include a CI register (CI-reg) for storing the convolution input data of a feature extraction layer and/or a fully connected input register (FCI-reg) for storing fully connected layer input data. The convolution block 540 may include a process element (PE) controller 543, a PE unit 545 including a plurality of PEs, an adder (ADD) block 547 including a plurality of adders, and an accumulator (ACC) block 549. The pooling block 550 may include a pooling operation unit 553 and a pooling input register 555. The output unit 560 may include a layer output register (LO-reg) and an activation block. The CNN operation apparatus may include a plurality of the channel hardware sets 520. Each of the channel hardware sets 520 may include the input unit 530, the convolution block 540, the pooling block 550 and the output unit 560.

Abbreviations which are used in various embodiments of the present invention are listed in Table 1 below.

TABLE 1

| ABBREVIATION | STAND FOR |
| --- | --- |
| CNN accel | Convolutional neural network accelerator |
| CH set | Channel hardware set |
| reg | Register |
| ID | Identification |
| CI | Convolutional input |
| L cfg | Layer configuration |
| CI id | Convolution input ID |
| CO_id | Convolution output ID |
| PI id | Pooling input ID |
| PO_id | Pooling output ID |
| L_id | Layer ID |
| PE | Process element |
| PE ctrl | Process element controller |
| K_id | Kernel ID |
| PI reg | Pooling input register |

The information processing unit 510 may include a register for storing pieces of information used in the elements of a CH set and a counter. The information processing unit 510 may include the address map register 511 for remapping input data, the weight register 512 for trained weight, registers for storing information about the configurations of layers and counters which will be used in operations. The registers of the information processing unit 510 are first described, and the counters are then described.

The registers are described below.

The weight register 512 may be a register for storing trained weight data sets. Learning may be a series of processes of learning features in an input data set. In a learning process, features may be learnt by performing convolution operation on an input data set and a weight data set. The convolution block 540 may perform convolution operation on a weight set and input data stored in the weight register 512, and may compute data that belongs to the input data set and the weight data set and that has the same input depth and weight depth.

When the system is in an initialization state, the address map register 511 may receive an address map (or address map for CI), received from the host in the initialization state, and store the received address map. The address map may include mapping information for convolution operation between an input data set and a weight data set, and may include an address map pre-computed by the host. The address map may be present in each layer. In a first layer, an address map may include information for mapping external input data to a weight data set. In layers subsequent to the first layer, the address map may be a map for mapping the address of a layer output register (hereinafter referred to as "LO reg)" of the output unit 560 to the address of a CI reg of the input unit 530. The arbiter of the CNN control unit 500 may receive the input data to the address of the CI reg based on the address map register 511. Furthermore, the arbiter may store the data of the LO reg of the output unit 560 in the CI reg based on the address map register 511. If input data is not present (if an input addr for the CI reg addr is not present), the CNN control unit 500 may set a zero flag (ZF) (e.g., ZF=1). In the case of an address whose ZF has been set, the CNN control unit 500 may store zero-padded input data in the CI reg.

The host may compute an address map of the address map register 511 in accordance with Equation 1 and Equation 2. Equation 1 may be used to compute a map between an input address and a zero-padded input address map (i.e., an input address to zero-padded input address map). The input address may be from 0 to W*H*D−1. Equation 2 may be used to compute an address map between a zero-padded input address and input data (including LO-reg data of the output unit 560) (i.e., a zero-padded input address to convolution input data address map). The address of a zero padding ZP reg may be computed from the address of a CI reg.

$$\text{for}(d = 0, d < D, d++) \tag{1}$$

$$ZP_{index} = (W^c + 2Z_x)(Z_y + \text{Quotient}) + Z_x + \text{Modulo}$$

$$\left(\text{Quotient, Modulo} = \frac{Input_{addr} - k(W^c \times H^c)}{W^c}\right)$$

$$ZP_{start\ addr} = d \times (W^c + 2Z_x^c)(H^c + 2Z_y^c)$$

$$ZP_{addr} = ZP_{start\ addr} + ZP_{index}(Input_{addr})$$

$Q$: Quotienet function $R$: Modulo function $\tag{2}$ $A1$: # of $CI$ elements for 1 $PO$: $D \times C_x \times C_y \times P_x \times P_y$ $A2$: Size of width of $PI$ matrix: $W^p + 2Z_x^p$ $A3$: Size of width of $CO$ matrix: $\frac{W^c - C_x + 2Z_x^c}{S_x^c} + 1$ $A4$: $Q(PI\ id, A3)$ $A5$: $R(PI\ id, A3)$ $A6$: $Q(CI\ reg\ index, C_x \times C_y)$ $A7$: $R(A6, D)$ $A8$: Size of Zero padded Input: $(W^c + 2Z_x^c)(H^c + 2Z_y^c)$ $A9$: Size of Convolution window: $C_x \times C_y$ -continued $A10$: $Q(CI\ reg\ index, A9)$ $A11$: $R(CI\ reg\ index - A10 \times A9, A9)$ $A12$: $Q(A11, C_x)$ $A13$: $R(A11 - Q(A11, C_x) \times C_x, C_x)$ $PO\ id(LO\ id) = Q(CI\ reg\ index, A1)$ $PI\ id(CO\ id) = Q(PO\ id, A2) \times (W^p + 2Z_x^p) \times S_y^p + R(PO\ id, A2) \times S_y^p$ $ZP\ start = A8 \times A7 + A4 \times (W^c + 2Z_x) + A5$ $ZP\ reg\ addr = ZP\ start + A12 \times (W^c + 2Z_x) + A13$ The layer configuration register (L cfg reg) 513 may be a register for storing information about the configuration of a corresponding layer. The CNN control unit 500 may check information included in the L cfg reg of a corresponding layer and configure a CI reg. The arbiter may compute the CO_id, PO_id and L id of input data from the L cfg reg, and may store the computed CO_id, PO_id and L id in the configured CI reg along with the input data. Information about the L cfg reg may include information, such as that listed in a layer configuration table of Table 2 below.

TABLE 2

| NAME | DESCRIPTION |
| --- | --- |
| Input data width/height/depth/channel | W/H/D/CH |
| Input data zero pad size | $Z_x$, $Z_y$ |
| Zero-padded width/height/size | W + 2 * Zx/H + 2 * Zy/ (W + 2 * Zx) * (H + 2 * Zy) |
| Conv layer width/height | $\dfrac{W^c}{H^c}$ |
| Conv later zero pad size | $\dfrac{Z_x^c}{Z_y^c}$ |
| Conv window size/ stride size | $Cx/Cy/\dfrac{S_x^c}{S_y^c}$ |
| Conv layer kernel | K |
| Conv output matrix size | ((W − Cx + 2Zx)/Sx)+ 1/ ((W − Cy + 2Zy)/Sy) + 1 |
| Pool layer width/height | $W^p/H^p$ |
| Pool layer zero pad size | $\dfrac{Z_x^p}{Z_y^p}$ |
| Pool window size/ stride size | $Px/Py/\dfrac{S_x^p}{S_y^p}$ |
| Number of input dataset layers | L num |
| Amount of input data per channel | W * H * D |
| CI data count max | Cx * Cy * D |
| PI data count max | Px * Py |
| LO data count max | $W^{Po} = \dfrac{W^{Pi} - P_x^P + 2Z_x^P}{S_x^P} + 1$ $H^{Po} = \dfrac{H^{Pi} - P_y^P + 2Z_y^P}{S_y^P} + 1$ $W^{Pi} = W^{Co} = \dfrac{W^{C_i} - C_x^C + 2Z_x^C}{S_x^C} + 1$ |

TABLE 2-continued

| NAME | DESCRIPTION |
|---|---|
| | $H^{P_i} = H^{C_o} = \dfrac{H^{C_i} - C_y^C + 2Z_y^C}{S_y^C} + 1$ |
| | Number of Pooling output elements = $W^{P_i} \times H^{P_i}$ |

An output value of the activation function LUT 514 may be a register for storing data for performing an activation function. Data stored in an LO reg of the output unit 560 may be data stored after an activation function is performed by the activation function LUT.

The drop-out generator 515 may generate a drop-out signal. A CNN algorithm may be highly complicated and overfitted due to the high complexity and thus may have long operation latency. Drop-out may be a normalization (or regularization) task for improving the complexity of the CNN algorithm. The term "drop-out (or pruning)" may mean that some of signals or nodes of one layer do not operate. That is, the drop-out may mean an operation for not receiving the value of a previous layer and also not transferring a value to a next layer. The drop-out generator 515 may make a determination so that some of the PEs included in the PE unit 545 of the convolution block 540 is dropped out.

The information processing unit 510 may include the following counters in addition to the aforementioned registers.

A channel counter 501 may be a counter for counting the number of channels of input data. A maximum value of the channel counter 501 may be the number of channels of an input data set. If the number of channels of input data is greater than the number of CH sets, a classification layer may not start until a value of the channel count reaches a maximum. For example, if the number of channels of input data is 5 and the number of CH sets is 3, a maximum value of the channel count may be 5. Furthermore, the three CH sets may extract the features of the input data of the three channels in parallel. Thereafter, when the extraction of the features of the input data of the three channels is completed, the channel counter 501 may set two of the three CH sets as a max channel count by setting the two CH sets. That is, the CNN control unit 500 may not execute a classification layer operation until a feature extraction layer operation corresponding to a maximum value of the channel counter 501 is completed.

A start layer counter/end layer counter 502 may be a counter for counting a start layer count and an end layer count to check the start and end state of a layer. A maximum value of the start layer count may be (the number of layers of an input data set−1). The start layer count may be increased by 1 until operation for a layer whose operation is being executed is terminated. The CNN operation apparatus may be aware of the state of a current layer by checking the value of the start layer count. A maximum value of the end layer count may be the number of layers of an input data set. The end layer count may be increased by 1 whenever a new layer starts, and may indicate the state of a current layer.

A counter 503 may count a CI data count/U data count. A maximum value of a CI data count/U data count may be Cx*Cy*D. The value of the CI data count may be increased by 1 whenever data corresponding to the same CO_id is added in the ADD block 547 of the convolution block 540. The count value may be a value for checking whether all of convolution input elements have been summed. If a value of the CI data count corresponding to the CO_id of a current layer is not a maximum, the ACC block 549 may input a data set to the last ADD block layer of the ADD block 547. In a fully connected (FC) layer, K_id may play the role of a CO_id.

A counter 506 may count PI data. A maximum value of the PI data count may be Px*Py. The pooling block 550 may check the value of the PO_id of a data set and increase the value of a corresponding PI data count by 1. When the value of the PI data count value reaches a maximum value, the pooling block 550 may output the data set to an LO reg of the output unit 560.

A counter 504 may count an LO data. A maximum value of an LO data count may be determined by Equation 3. When the L_id of a data set inputted to an LO reg is confirmed, the LO data counter 504 may increase a corresponding LO data count by 1. The LO data counter 504 may indicate whether all of the outputs of a corresponding layer have been computed.

A counter 507 may count kernel. A maximum value of a kernel counter 507 may be K. If the K_id of a data set inputted to an LO reg is configured, the kernel counter 507 may increase the value of a corresponding kernel count by 1. The kernel counter 507 may indicate whether all of the outputs of a corresponding layer have been computed.

The information processing unit 510 may store pieces of information which are used in the channel hardware sets 520. Table 3 below shows elements using the pieces of information of the information processing unit 510.

TABLE 3

| | CNN control unit | | Convolution block | | | | |
|---|---|---|---|---|---|---|---|
| | Arbiter | MMU | PE controller | PE | ADD, ACC | Pooling | LO reg |
| CI re-map | | O | | | | | |
| Address map | | | | | | | |
| L cfg reg | O | O | O | O | O | O | O |
| Weight reg | | | | O | O | O | |
| Channel cnt | O | O | | | | | |
| Start layer cnt | | O | | | | | |
| End layer cnt | | | | | | | |
| CI data cnt | | | O | | O | | |
| LI data cnt | | | | | O | | |
| LO data cnt | | | | | | | O |
| Drop out gen | | | | O | | | |
| K id cnt | | | | O | | O | O |
| PI data cnt | | | O | | | O | O |
| Kernel cnt | | | | | | | O |

A CNN operation apparatus having the same configuration as that of FIG. 5 may be a CNN accelerator, and may perform both a feature learning part (or feature extraction part) and a classification part. Channel hardware sets 521-52N may be properly designed depending on the number of channels of input data to be used. For example, if input data is RGB image data, the number of channels may be 3, and a channel hardware set may be configured to be 3.

Each of the channel hardware sets 521-52N may receive the input data of a corresponding channel and executes a feature extraction operation and a classification operation. Each of the channel hardware sets 521-52N may include the input unit 530, the convolution block 540, the pooling block 550 and the output unit 560. Each of the channel hardware sets 521-52N may first execute a feature extraction operation based on the operations of the input unit 530, the convolution block 540 and the output unit 560. After completing the feature extraction operation, a selected channel hardware set of the channel hardware sets 521-52N may execute a classification operation. The selected channel hardware set may execute the classification operation based on the operations of the input unit 530, the convolution block 540 and the output unit 560.

The channel hardware sets 521-52N may be responsible for the computation of the CNN algorithm. The computation of the CNN algorithm may include convolution, pooling and element-wise multiplication and addition. The information processing unit 510 may store information which is used in the operating blocks of the channel hardware sets 521-52N. The information processing unit 510 may include the address map register 511 for configuring input data inputted to the input unit 530, the weight register 512 for storing trained weight, the L cfg register 513 for storing information about the configuration of each layer and so on. The information processing unit 510 may include counters which may be used in operations.

Input data inputted to the channel hardware sets 521-52N may include 16 or 36-point data. Furthermore, the input data may include a floating or fixed data format (e.g., a 16 or 32 floating or fixed point format). The convolution block 540 of the channel hardware sets 521-52N may have different configurations depending on the format of input data. The number of PEs included in the PE unit 545 and the number of adders included in the ADD block 547 of the convolution block 540 may be properly selected based on resources and input data. When input data is stored in the input unit 530, the convolution block 540 may immediately start operation.

The CNN operation apparatus may execute a feature extraction layer operation. After the feature extraction layer operation is completed, the CNN operation apparatus may execute a classification layer operation.

A feature extraction layer operation is described below.

The CNN control unit 500 may perform a function for configuring input data in order to efficiently perform the calculation of each layer using the limited processor elements of the convolution block 540. That is, the CNN control unit 500 may function to configure a CI reg (i.e., a convolution input data register) of the input unit 530. The CNN control unit 500 may check information stored in the L cfg reg 513 of a corresponding layer and configure a CI reg of the input unit 530. In a feature extraction layer, the CNN control unit 500 may assign one of the channel hardware sets 520 to each channel of input data and distribute the input data to the assigned one of the channel hardware sets 520. If the number of channels of input data is greater than that of channel hardware sets 520, the CNN control unit 500 may compute channels by assigning the channel hardware sets 520 to channels for the input data after the calculation of the number of channel hardware sets 520 is terminated. For example, if the number of channel hardware sets 520 is 3 (i.e., N=3) and the number of channels for input data is 5, the CNN control unit 500 may first calculate the number of channel hardware sets by assigning the input data of the three channels to the three channel hardware sets. When the calculation of the input data for the three channels is terminated, the CNN control unit 500 may compute the input data by assigning the input data to two of the three channel hardware sets.

The CI reg of the input unit 530 may store new input data received through an external interface by the CNN control unit 500 and may also store the output data of a previous layer as input data. That is, the input data may be data received from the outside in a first layer. Data after a second layer may be data output by the output unit 560 of the previous layer.

The CNN control unit 500 may store input data in a CI reg of the input unit 530 based on address map information stored in the address map register 511 of the information processing unit 510. As described above, the address map information may be previously computed by the host. When the system is initialized, the address map information may be stored in the address map register 511 of the information processing unit 510. For example, in FIG. 2, the input data 210 may have a data size different from the window data 220 due to zero padding. When the convolution block 540 performs convolution operation on an input data set and a weight data set, the input data set and the weight data set may have the same size. Accordingly, the host may previously compute an address map for making identical the sizes of an input data set and a weight data set having a data size changed due to zero padding, and may store the computed address map in the address map register 511. The address map may be generated using a method, such as that of Table 4 below, in accordance with Equation 1 and Equation 2 as described above. The address map may include information about the address of a CI reg of the input unit 530 in which input data is stored.

The CNN control unit 500 may store data, received from the external system, in a CI reg of the input unit 530 as input data through the wrapper 570 in a first feature extraction layer. Furthermore, in feature extraction layers from a second feature extraction layer to the last feature extraction layer, the CNN control unit 500 may store data, computed in a previous feature extraction layer and output, as input data.

Figures 6, 7:
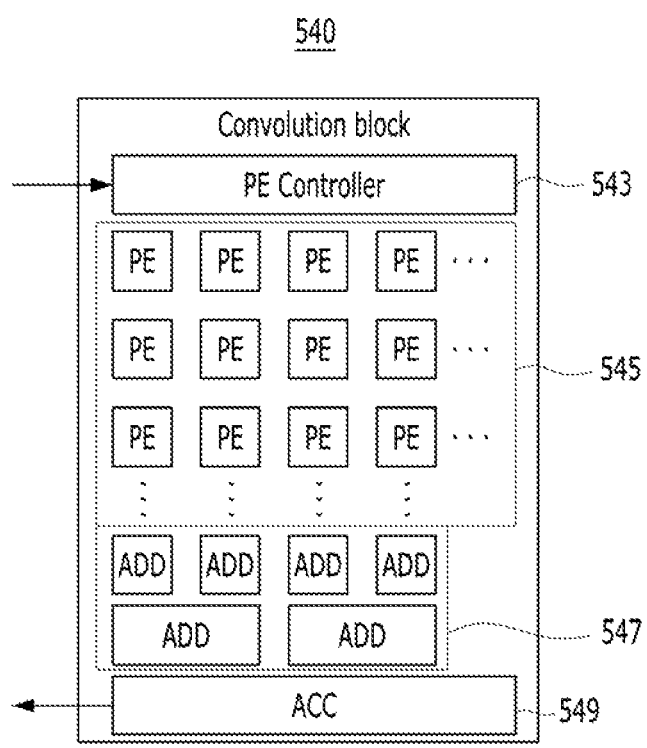
FIG. 6 is a diagram showing an exemplary architecture of an input data set (or a CI reg input data set) stored in a CI reg of an input unit, in accordance with various embodiments of the present invention.
FIG. 7 is a diagram showing an exemplary configuration of a convolution block, in accordance with various embodiments of the present invention.

FIG. 6 is a diagram showing an exemplary input data set, in accordance with various embodiments of the present invention. For example, FIG. 6 shows the architecture of an input data set (or a CI reg input data set) stored in a CI reg of the input unit 530 of FIG. 5. The input data set may include input data "i. data", a zero flag Z_F, a CO_id, a PO_id, an L_id, etc.

When storing the input data in the CI reg, if a value of the input data is 0, the arbiter of the CNN control unit 500 may set the Z_F (e.g., masks a Z_F bit to 1). When the Z_F bit of the input data is set, the convolution block 540 and the pooling block 550 may rapidly execute a computation operation based on the Z_F bit. For example, the convolution block 540 and the pooling block 550 may output 0 without a computation operation in the case of multiplication operation and immediately output a different value (i.e., an operand value) in the case of addition, thereby being capable of reducing operation latency.

When the calculation in the feature extraction layer is terminated, the CNN control unit 500 may select one of the channel hardware sets 520, may input the entire input data to the selected channel hardware set, and may execute a computation operation. Operation in a classification layer may be a convolution computation operation, and a pooling operation may be omitted.

When storing input data in a CI reg of the input unit 530, the CNN control unit 500 may take the state of a current layer into consideration. When remapping input data and storing the remapped data in a CI reg, the CNN control unit 500 may check the configuration of a corresponding layer in the L cfg reg 513, may determine the address of the LO reg of the output unit 560 through the address map register 511, and may store LO data at the location of the corresponding address in the CI reg of the input unit 530 as the input data. The address map register 511 and the L cfg reg 513 may receive address map (or CI re-map address map) information and layer configuration information through respective wrappers 570 from the host in the initialization state, and may store them. The address map register 511 may store address maps corresponding to respective layer. The layer configuration information of the L cfg reg 513 may be the layer configuration table of Table 3.

When storing input data having an architecture, such as that of FIG. 6, up to the last address of a CI reg, the arbiter of the CNN control unit 500 may continue to store input data in the region of CI regs that have already been processed from the very beginning. The size of the CI reg may be determined by taking into consideration the bandwidth of an external interface and the bandwidth of the CNN operation apparatus (i.e., the bandwidth of deep learning accelerator hardware). The arbiter of the input unit 530 may read the CO_id, a PO_id and an L id of input data from the L cfg reg 513 and store input data having an architecture, such as that of FIG. 6. Furthermore, when each of the PEs of the convolution block 540 computes input data, the arbiter of the input unit 530 may provide the Z_F of the corresponding input data, thereby being capable of reducing operation latency.

The CNN operation apparatus may execute a pooling operation using convolution-computed data in a feature extraction layer. A method for executing a pooling operation after waiting for all of pooling inputs (or convolution outputs) when executing the pooling operation using convolution output may consume a lot of time. If only two or more pooling inputs (or convolution outputs) are present, the CNN operation apparatus (or channel hardware set) can complete the calculation of the entire feature extraction layer more rapidly by previously executing a pooling operation using the two values. If two or more pooling inputs are present, the CNN operation apparatus (or channel hardware set) may execute a pooling operation regardless of whether a convolution operation has been completed or not. To this end, the CNN operation apparatus (or channel hardware set) may first compute input data corresponding to a convolution input operand that involves one pooling input.

In order to first compute required input data, the arbiter of the CNN control unit 500 may read the required input data from the LO reg of the output unit 560 with reference to the CI re-map addr map of the address map register 511 of the information processing unit 510, and may store the read input data in a CI reg of the input unit 530 as input data. As described above, in the initialization state, the CI re-map addr map of the address map register 511 may receive a calculated value from the host and store the received value. The CI re-map addr map may be present in each layer. Reference may be made to Equation 1 and Equation 2 for a method for configuring the CI re-map addr map.

The arbiter of the CNN control unit 500 may output the input address of a CI reg to the address map register 511 through the wrapper 570, and may store a value read from the address map register 511 in a CI reg indicated by the address of the corresponding CI reg. If an input address corresponding to the address of the CI reg is not present, the CNN control unit 500 may set the Z_F to 1. An address whose Z_F is set to 1 may correspond to zero padding (i.e., the zero padding of CNN data pre-processing). For example, if input data, a convolution parameter and a pool parameter have the following conditions, they may be expressed in a map form, such as that of Table 4:

input data; W=3, H=3, D=3, CH=3.
first layer parameter convolution: Cx=Cy=D=3, Zx=Zy=Sx=Sy=1, K=2
first layer parameter pool; Px=Py=2, Sx=Sy=1

TABLE 4

| CI reg addr | ZP reg addr | Input addr |
|---|---|---|
| 0 | 0 | |
| 1 | 1 | |
| 2 | 2 | |
| 3 | 5 | |
| 4 | 6 | 0 |
| 5 | 7 | |
| 6 | 10 | |
| 7 | 11 | 3 |
| 8 | 12 | 4 |
| 9 | 25 | |
| 10 | 26 | |
| 11 | 27 | |
| 12 | 30 | |
| 13 | 31 | 9 |
| 14 | 32 | 10 |
| 15 | 35 | |
| 16 | 36 | 12 |
| 17 | 37 | 13 |
| 18 | 50 | |
| — | — | — |
| — | — | — |
| — | — | — |

When the input data is stored in the CI reg of the input unit 530, the convolution block 540 may execute a convolution operation. The convolution block 540 may include the PE controller 543, the PE unit 545 including a plurality of PEs, the ADD block 547 including a plurality of adders and the ACC block 549. The convolution block 540 may receive an input data set stored in the CI reg of the input unit 530 and a weight data set stored in the weight register 512, and may output convolution-computed output data to the pooling block 550.

Figure 8A:
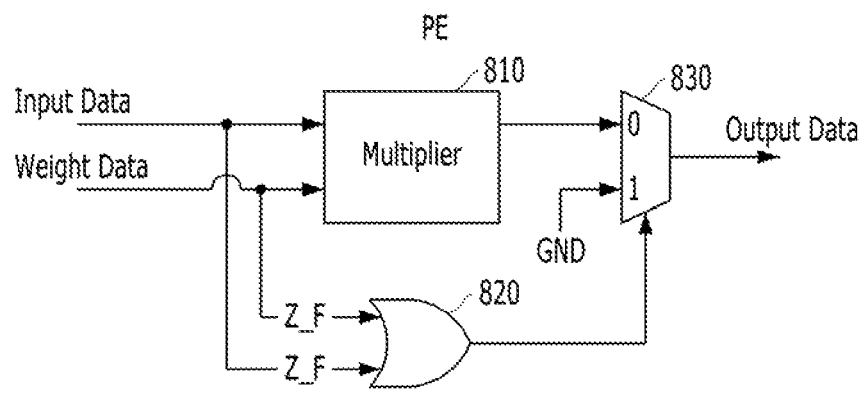
FIGS. 8A and 8B are diagrams showing exemplary configurations of process elements of a convolution block, in accordance with various embodiments of the present invention.
Figure 8B:
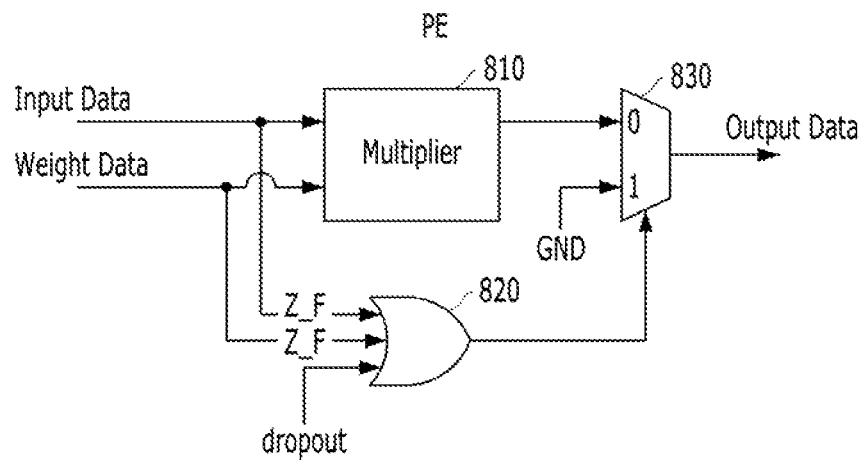
Figures 9A, 9B:

FIG. 7 is a diagram showing ta convolution block in accordance with various embodiments of the present invention. FIGS. 8A and 8B are diagrams showing process elements (PEs) of a convolution block in accordance with various embodiments of the present invention. FIGS. 9A to 9C are diagrams showing the architecture of an input data set, weight data set and result data set of a convolution block in accordance with various embodiments of the present invention. For example, in FIGS. 7 to 9C, the convolution block may be the convolution block 540 in FIG. 5.

Referring to FIG. 7, the convolution block 540 may include the PE controller 543, the PE unit 545 including a plurality of PEs, the ADD block 547 including a plurality of adders, and the ACC block 549.

Each of the PEs of the PE unit 545 may execute an operation for multiplying received input data and weight data sets. The PE controller 543 may input an input data set and a weight data set from a corresponding CI reg of the input unit 530 and the weight register 512 to a corresponding PE 545 so that the PE unit 545 can perform convolution multiplication operation. The PE controller 543 can reduce the time taken to read the weight data set by prefetching the weight data set from the weight register 512. The PE controller 543 of the CNN operation apparatus may prefetch a weight data set from the weight register 512 with reference to the start layer count/end layer counter 502. For example, if the count value of the start layer counter is 1 and the count value of the end layer counter is 3, the PE controller 543 may prefetch the weight data sets of a layer 1-layer 3 from the weight register 512. The PE controller 543 may input a weight data set that belongs to the prefetched weight data sets and that corresponds to the L_id of input data to a PE included in the PE unit 545.

The PE controller 543 may input the input data set of the CI reg of the input unit 530 and the weight data set of the weight register 512 of a corresponding layer to PEs of the PE unit 545 which are ready for calculation. The multiplication operations of the respective PEs to which the input data set and the weight data set are inputted may be performed at different times. If one or more input data is present in the CI reg of the input unit 530 and a PE capable of calculation is present in the PE unit 545, the PE controller 543 may input corresponding input data and weight data sets to PEs that are included in the PE unit 545 and that have been ready. If the PEs are the ready state (i.e., when the calculation of the multiplication of previous input data and weight data sets is terminated), the PE controller 543 may input next input data and weight data sets to the corresponding PEs and increase the read pointers of the CI reg of the input unit 530 and the weight register 512 by 1. Furthermore, if the weight data set is 0, the PE controller 543 may set the Z_F to 1.

The PE controller 543 may receive input data having an architecture, such as that of FIG. 6, to a PE whose multiplication operation has been terminated. The PE controller 543 may execute a computation operation on input data having a CO_id. That is, the output of the convolution block 540 may be the results of the addition of all of the multiplication result values of input data having the same CO_id. The PE controller 543 may check layer configuration information of the L cfg reg 513, may generate a weight data set, and may input the generated weight data set to the PE unit 545. The PE controller 543 may check the values of the start layer counter/end layer counter 502 and layer configuration information of a corresponding L cfg reg 513 and prefetch a weight data set corresponding to the weight register 512, thereby being capable of reducing the time taken to read the weight data set. The K_id is indicative of a weight set number and may be used for each channel hardware set 520 to determine whether or not to execute the operation of a next layer (i.e., a layer operation).

The PE unit 545 may perform convolution multiplication operation on input data and weight data sets received from the PE controller 543. The ADD block 547 may add the result values of the convolution multiplication operation, output by the PE unit 545, together. The ACC block 549 may accumulate the outputs of the ADD block 547 added so that the result values of all of the convolution multiplication operations are added together. When all of the result values of the convolution multiplication operations are accumulated, the ACC block 549 may output the accumulated result value to the pooling block 550.

Referring to FIG. 8A, each of the PEs of the PE unit 545 of the convolution block 540 (shown in FIG. 5) may receive an input data set, such as 911 of FIG. 9A, and a weight data set, such as 913 of FIG. 9A, and may perform a convolution layer operation on the input data set and the weight data set. As shown in 911 of FIG. 9A, the input data set may be a data set, including input data, a ZF (Z_F), a convolution output ID (CO_id), a pooling input ID (PI id), a pooling output id (PO_id) and a layer id (L_id). As shown in 913 of FIG. 9A, the weight data set may be a data set, including weight data, a Z_F and a kernel id (K_id). The multiplier 810 may multiply the input data set 911 and the weight data set 913. An OR gate 820 may perform OR operation on a Z_F, included in an input data set having the same architecture as the input data set 911, and a Z_F Included in a weight data set having the same architecture as the weight data set 913. A selector (or multiplexer) 830 may first input the output of the multiplier 810 (i.e., the first input), may second input a ground (or zero) signal (i.e., the second input), may select and out one of the first input or the second input based on the output of the OR gate 820. Each of the PEs of the PE unit 545 may include the multiplier 810 corresponding to the number of points of input data. For example, each PE may be a 16-bit or 32-bit/floating or fixed point multiplier. Each PE may receive an input data set and a weight data set, such as those shown in FIG. 9A, under the control of the PE controller 543. The multiplier 810 may perform convolution multiplication operation on the received two data. The output of the multiplier 810 may become the first input of the selector 830. The OR gate 820 may perform OR operation on a Z_F included in an input data set, such as the input data set 911, and a Z_F included in a weight data set, such as the weight data set 913. Accordingly, if any one of the Z_Fs included in the Z_F signals of the input data set and the weight data set is a set state, the selector 830 may select and output the second input. That is, if both the Z_Fs of the input data and the weight data set are not set, the selector 830 may select the output of the multiplier 810. The data set of a PE output by the selector 830 may have the same architecture as the result data set 915 of FIG. 9A. The result data set of the PE may be a data set, including result data, a Z_F, a CO_id, a PO_id, an L_id and a K_id.

Referring to FIG. 8B, each of the PEs of the PE unit 545 may output zero data in response to a drop-out signal in the fully connected layer operation of a classification layer. The multiplier 810 may execute convolution multiplication operation on received two data (i.e., input data and weight data). The OR gate 820 may perform OR operation on a drop-out signal "dropout" and Z_Fs included in an input data set, such as the input data set 911 of FIG. 9A, and a weight data set, such as the weight data set 913 of FIG. 9A. The drop-out signal may be a signal to drop out the operation of PEs set in a classification operation, and may refer to the output of the drop-out generator 515 of the information processing unit 510 in FIG. 5. Accordingly, if any one of Z_Fs included in the Z_F signals of the input data and the weight data is a set state or the drop-out signal is a set state, the selector 830 may select and output the second input. That is, if both the Z_Fs of the input data and the weight data are not set and the drop-out signal is not a set state, the selector 830 may select the output of the multiplier 810.

If the Z_F of input data or weight data is 1, the CNN operation apparatus may set the Z_F of a computed result value (or result data packet) to 0 and hand over the set Z_F to a next step. Since the data (i.e., operand data) of the CNN algorithm is basically 0, the convolution block 540 may check only a Z_F and may not perform calculation, thereby being capable of enhancing a convolution calculation speed. Furthermore, if a drop-out signal is a set state, the convolution block 540 may not perform a convolution computation operation.

Each of the PEs of the PE unit 545 may insert the K_id of a weight data set, such as the weight data set 913 of FIG. 9A, into the K_id of a result data set having an architecture, such as the result data set 915 of FIG. 9A. A result data set computed by each of the PEs of the PE unit 545 may be transmitted to the ADD block 547. At least two PE result values may be transmitted to one of the adders of the ADD block 547. Required values of the features values of each operand data set may be stored as a result data set and transmitted to the ADD block 547.

The ADD block 547 may include a plurality of adders (e.g., 16-bit or 32-bit/floating or fixed point adders). The ADD block 547 may executed an operation for receiving two or more multiplication result values calculated by PEs of the PE unit 545 and adding them together. For example, each of the adders of the ADD block 547 may output an addition result data set, such as an addition result data set 935 of FIG. 9B, by adding a first result data set, such as a result data set 931 of FIG. 9B output by the PE unit 545, and a second result data set, such as a result data set 933 of FIG. 9B, together. Each of the result data sets 931 and 933, such as the first and the second result data sets, may have the same architecture as the result data set 915 of FIG. 9A. In this case, if the Z_F of input data (i.e., operand (PE result data), for example, a PE result value A, such as the result data set 931) of an adder of the ADD block 547 is a set state (i.e., Z_F=1, other input data (i.e., operand, a PE result value B, such as the result data set 933) whose Z_F is not set may be output as an addition result value without any change. If both the Z_Fs of two data (i.e., operands), such as the result data sets 931 and 933 of FIG. 9B, are a set state, the adder of the ADD block 547 may store feature information (or feature bit values) in a result data set, such as the result data set 935, and may output the feature information to a next block (i.e., the ADD block or the ACC block).

Each of the adders of the ADD block 547 may add data, corresponding to the same CO_id, together. That is, data (i.e., PE output data) inputted to an adder of the ADD block 547 may have the same architecture as the result data set 931 or 933. Each adder may receive two data that belongs to PE output data and that has the same CO_id and may add the two data together. In this case, if the two data (i.e., operands) do not have the same CO_id, the adder may hand over the two data without performing an addition operation.

Whenever the convolution block 540 performs an addition operation on data having the same CO_id, it may increase the count value of the CI data counter 503, corresponding to the CO_Id of the information processing unit 510, by 1. The CI data count may increase up to Cx*Cy*D. Information about each of the counts of the information processing unit 510 is listed in Table 2. A maximum value of each of the counter may be stored in the L cfg reg 513. Each of the adders of the ADD block 547 may add two input data together. Accordingly, the adders may include multi-stage adders (i.e., ADD block layers). The adders of a first stage may have an architecture for receiving two data output by the PE unit 545 and adding the two data together. The adders of each of stages subsequent to the first stage may have an architecture for adding two data output by the two adders of a previous stage together. Accordingly, a maximum amount of data which may be received as an ADD operand may be increased as the ADD block layer proceeds. The adder may add data that belongs to the received data and that has the same CO_Id together, and may hand over all of the remaining data to a next ADD block layer.

The ACC block 549 may accumulate the outputs of the last adder layers of the ADD block 547, such as input data sets 951-955 of FIG. 9C. The ACC block 549 may check the CO_id of data output by the ADD block 547. If the value of the CI data counter 503 corresponding to the checked CO_id reaches a maximum (i.e., Cx*Cy*D of a corresponding layer), the ACC block 549 may store corresponding data, such as an input data set 961 of FIG. 9C, in the pooling input register (hereinafter referred to as a "PI reg") 555 of the pooling block 550. If the value of a corresponding CI data counter 503 is not a maximum value, the ACC block 549 may input corresponding data, such as an input data set 963 of FIG. 9C, to the last adder layer of the ADD block 547 again. The last adder layer may check that data has been received from the ACC block 549 and perform an addition operation on the received data. If the value of the CI data counter 503 has not reached a maximum value, it may mean that input data having a corresponding CO_id is still computed or data has not been transmitted by the CI reg of the input unit 530. When the ACC block 549 hands over result data to the pooling block 550, a CO_id is no longer used. Accordingly, a CO_id can be removed as in the input data set 961 of FIG. 9C.

FIG. 10 is a diagram showing an exemplary architecture of input data in a pooling operation of a convolutional neural network (CNN) operation apparatus, in accordance with various embodiments of the present invention. The input data of a pooling operation may be the output data of the convolution block 540 in FIG. 5, such as the input data set 961 of FIG. 9C. FIG. 11 is a diagram showing an exemplary architecture of output data and activated data in a pooling block (e.g., the pooling block 550 in FIG. 5) of a convolutional neural network (CNN) operation apparatus in accordance with various embodiments of the present invention.

Convolution-computed result data, such as that of FIG. 10, may be sequentially stored in the PI register 555 of the pooling block 550. When two or more data (i.e., convolution-computed data) is stored in the PI register 555, the pooling operation unit 553 may check a PO_id and perform a pooling operation on data having the same PO_id. Although all of values on which a pooling operation is to be performed are not received, if two or more result values having the same PO_id are stored in the PI register 555 (i.e., if two or more values having the same PO_id are stored in the PI register 555), the pooling block 550 may immediately execute a pooling operation. Accordingly, pooling operation latency can be reduced.

When performing a pooling operation, the pooling block 550 may check the value of a PO_id and increase the count value of a corresponding PI data counter 506 by 1. A maximum value of the PI data counter 506 may be Px*Py as listed in Table 2. In the pooling operation of the pooling block 550, a method for selecting an input that belongs to two inputs and that has a maximum value or calculating an average value of the two inputs may be used. In the case of the method for selecting a maximum value (i.e., max pooling), the pooling block 550 may select data that belongs to two data and that has a greater value only if the two data are present, may store the selected data in the PI register 555, and may discard the data having a smaller value. In the case of the method for calculating an average value (i.e., average pooling), the pooling block 550 may calculate an average of two values and store the calculated value in the PI register 555 again.

The pooling block 550 can rapidly execute a pooling operation using a Z_F in pooling input data having an architecture, such as that of FIG. 10. After performing the pooling operation, the pooling block 550 may check the value of the PI data counter 506 of a corresponding PO_id. If the value of the PI data counter 506 reaches a maximum value (Px*Py), the pooling block 550 may output the result value of the pooling operation to the LO register of the output unit 560. When outputting the result values of the pooling operation to the LO register of the output unit 560, the pooling block 550 may output the result values in order of PO id. Accordingly, a PO_id can be removed as in an LO register input data set 111 of FIG. 10 because it is no longer required in the architecture of data to be transmitted. If the value of the PI data counter 506 of a corresponding PO_id does not reach a maximum value, the pooling block 550 may store the result value of the pooling operation in the PI register 555 again and wait until data having the same PO_id is received.

Data on which a pooling operation has been terminated by the pooling block 550 may be stored in the LO register of the output unit 560.

The data of the LO register may be subjected to an activation function and stored. In the activation function, the data of the LO register may be computed with reference to the activation function LUT 514 of the information processing unit 510 or by directly performing the activation function. The output unit 560 may check the L_id of data, such as the LO register input data set 1111 of FIG. 11 stored in the LO reg, and may increase the count value of a corresponding LO data counter 514 of the information processing unit 510 by 1 whenever a result value is received. When the value of the LO data counter 504 is a maximum value, a corresponding value may be used as the input data of a next layer. When the value of the LO data counter 504 is a maximum value, the CNN control unit 500 may increase the value of the end layer counter 502 by 1 and store the value of the LO register of the output unit 560 in the CI register of the input unit 530 as input data. Furthermore, the PE controller 543 of the convolution block 540 may check the value of the end layer count and prefetch input data stored in the CI register of the input unit 530. Furthermore, the PE controller 543 may prefetch the weight data set of a corresponding layer from the weight register 512 of the information processing unit 510. However, since all of kernels (this is the same as the kernel of current layer output and the depth of next layer input) are not computed, the PE controller 543 of the convolution block 540 cannot remove the prefetch value of a weight data set indicated by the start layer counter 502. The kernel value may be checked by the K_id and the kernel counter 507 of the information processing unit 510. A maximum value of the LO data counter 504 may be determined as indicated in the layer configuration table of Table 2. If the value of the LO data counter 504 is not a maximum value, the CNN operation apparatus may wait until a result value of data that has not been computed and that has the same L_id is output.

The channel hardware set 520 may check the K_id of data inputted to the LO register and increase the value of the kernel counter 507 by 1. If a kernel count corresponding to the K_id is a maximum value, the channel hardware set 520 may release a weight data set indicated by a start layer because it may no longer be necessary to use information about a layer indicated by the start layer. The MMU of the CNN control unit 500 may control the operation of the channel hardware set 520 with reference to the configuration value of a next layer that has already been set in the L cfg register 513. If there is a layer that needs to be analyzed based on a result of the analysis of the configuration of a next layer, the CNN control unit 500 may set next input data by inputting the data of the LO register of the output unit 560 to the address map register 511, and may store the set input data in the CI register of the input unit 520.

If both the values of the LO data counter 504 and the kernel counter 507 reach maximum values, any data corresponding to a current start layer and end layer does not remain in the convolution block 540 and the pooling block 550. Accordingly, the CNN control unit 500 and the channel hardware set 520 may increase the start layer, may release the weight data, may increase the end layer, and may store input data in the CI register of the input unit 530 according to each case.

If both the values of the kernel counter 507 and the channel counter 501 reach maximum values, the CNN control unit 500 may terminate the feature extraction layer operation and execute the classification layer operation. That is, the classification layer (i.e., an FC layer) may check the values of the kernel counter 507 and channel counter 501, and may start when the calculation of all of input channels is terminated. If the value of the channel counter 501 does not reach a maximum value, the classification layer may wait until all of the input data of different channels are learnt. For example, if the CNN operation apparatus includes three channel hardware sets and learns five channel data, the value of the channel counter 501 may be 5. In such a case, the channel hardware sets may learn three channel data at the same time. At this time, when the learning of the three-channel data is terminated, the value of the channel count may become 3, and a feature extraction layer operation may be performed until the value of the channel count reaches the maximum value of 5. That is, although the feature extraction layer operation for the channel hardware sets is terminated, if the feature extraction layer operation for the next channel data has not been terminated, the CNN control unit 500 may wait until the feature extraction layer operation for other channel data is terminated (e.g., until next two channel data is learnt after the three-channel data is learnt, that is, until the value of the channel count becomes 5).

FIG. 12 is a diagram showing an exemplary architecture of the input and output data of a convolution block in a classification layer of a CNN operation apparatus, in accordance with various embodiments of the present invention. FIG. 13 is a diagram showing an exemplary architecture of layer output data in a CNN operation apparatus, in accordance with various embodiments of the present invention. As shown in FIG. 1, a classification layer may include at least one fully connected layer (hereinafter referred to as an "FC layer").

In a classification layer operation, the arbiter of the CNN control unit 500 in FIG. 5 may store input data having an architecture, such as that of FIG. 12, in the fully connected input register of the input unit 530 with reference to the L cfg register 513 of an FC layer. For example, if Cx=Cy=1 and Sx=Sy=1, the input data may have the same window as the FC layer. The input data of the FC layer may be the output of all of channel hardware sets of a previous feature extraction layer. In the FC layer, the input data may be inputted to one channel hardware set in order to compute the output of all of feature extraction layers. For example, if the features of three channel data have been extracted in a feature extraction layer, in one channel hardware set of an FC layer, the output values of the feature extraction layer may be inputted to the three-channel data. The input data of the FC layer may be sequentially inputted to the input unit 530. That is, the input data of the feature extraction layer is remapped with reference to the address map register 511 and then inputted to the input unit 530. In contrast, the input data of the FC layer may be sequentially inputted to the input unit 530. The number of weight data may be equally divided by the number of channel hardware sets 520 and inputted. A total number of weight data (or weight elements) may be the number of (input data×output data). The number of K_ids of the FC layer may correspond to the number of output data. A maximum value of a kernel counter 507 in each channel hardware set 520 may be (the number of output data/CH set).

In the FC layer, unlike in the feature extraction layer, the convolution block 540 may perform the function of a CO_id using a K_id. The PE unit 545 may multiply input data and weight data, and the ADD block 547 may add data that belongs to the multiplied data and that has the same K_id together. The ADD block 547 may check the K_id of the added data and increase the value of the LI data counter 503.

If a value of the LI data counter 503 corresponding to the K_id of the input data is equal to the number of input data of the layer, the ACC block 549 may store the input data in the LO register of the output unit 560. In the FC layer, the pooling block 550 may not operate as described above. When storing the input data in the LO register, the output unit 560 may store the input data in the sequence of K_ids, and the K_id of the stored data may be removed.

In the convolution block 540, each of the PEs of the PE unit 545 may have a configuration, such as that of FIG. 8B. The multiplier 810 may multiply input data, such as an FC layer input data set 1211 of FIG. 12 and weight data, such as an FC layer weight data set 1213 of FIG. 12. The OR gate 820 may perform an OR operation on a Z_F, included in input data having the same architecture as the FC layer input data set 1211 of FIG. 12, and a Z_F included in weight data having the same architecture as the FC layer weight data set 1213 of FIG. 12. The selector 830 may receive the output of the multiplier 810 as a first input and a ground (or zero) signal as a second input, and may select and output one of the first input or the second input based on the output of the OR gate 820. If the Z_F of any one of Z_F signals which are included in the input data and the weight data is a set state, the selector 830 may select and output the second input. That is, if both the Z_Fs of the Z_F signals included in the input data and the weight data are not set, the selector 830 may select the output of the multiplier 810. The output data of a PE through the selector 830 may have an architecture, such as an FC layer result data set 1215 of FIG. 12.

The CNN operation apparatus may execute a drop-out operation, e.g., one of regularization methods for improving the performance of a deep learning algorithm, in a classification layer. A drop-out function may mean that the computation operations of a predetermined number of PEs of a plurality of PEs are dropped out. In various embodiments of the present invention, the convolution block 540 may apply a drop-out signal to a PE that performs a convolution multiplication operation. A PE that receives a drop-out signal may drop out a computation operation for two input data. That is, a PE that receives a drop-out signal may compute input data (i.e., operand) (e.g., a Z_F=1) as if the input data is 0, and may send a result value. The drop-out signal may be generated by the drop-out generator 515 of the information processing unit 510. A probability that each PE of the PE unit 545 will be selected may be determined based on a parameter value of the drop-out generator 515. When a drop-out signal is received, the OR gate 820 of a corresponding PE may apply the drop-out signal as the selection signal of the selector 830. In response thereto, the selector 830 may select and output ground data (or zero data). If the Z_F of input data is set, the Z_F of weight data is set or a drop-out signal is received, each of the PEs of the PE unit 545 may select and output zero data. If the Z_Fs of input data and weight data are not set and a drop-out signal is not received, each of the PEs of the PE unit 545 may select the output of the multiplier 810.

When data, such as the FC layer result data set of FIG. 12 output by the convolution block 540, is output, the activation function operation of the output unit 560 may be performed. The output unit 560 may increase a value of the LO data counter 504, corresponding to the L_id of the output data of the convolution block 540, by 1 whenever the output data of the convolution block 540 is received. Furthermore, the arbiter of the CNN control unit 500 may read the value of the LO data counter 504 when the value the LO data counter 504 reaches a maximum value layer output number. If the value of the LO data counter 504 is not a maximum value, the output unit 560 may wait until data having an L_id is received. When the data is output to the arbiter of the CNN control unit 500, the L_id of the data may be removed because it is no longer necessary. In the case of the last FC layer, a Z_F may also be removed. The output data of the LO register of the output unit 560 may have an architecture, such as an FC layer LO register result data set of FIG. 13. The arbiter of the CNN control unit 500 may sequentially collect the result values of the classification layer performed in channel hardware sets, such as the FC layer LO register result data set of FIG. 13, and output them to the host through the wrapper 570.

Figure 14:
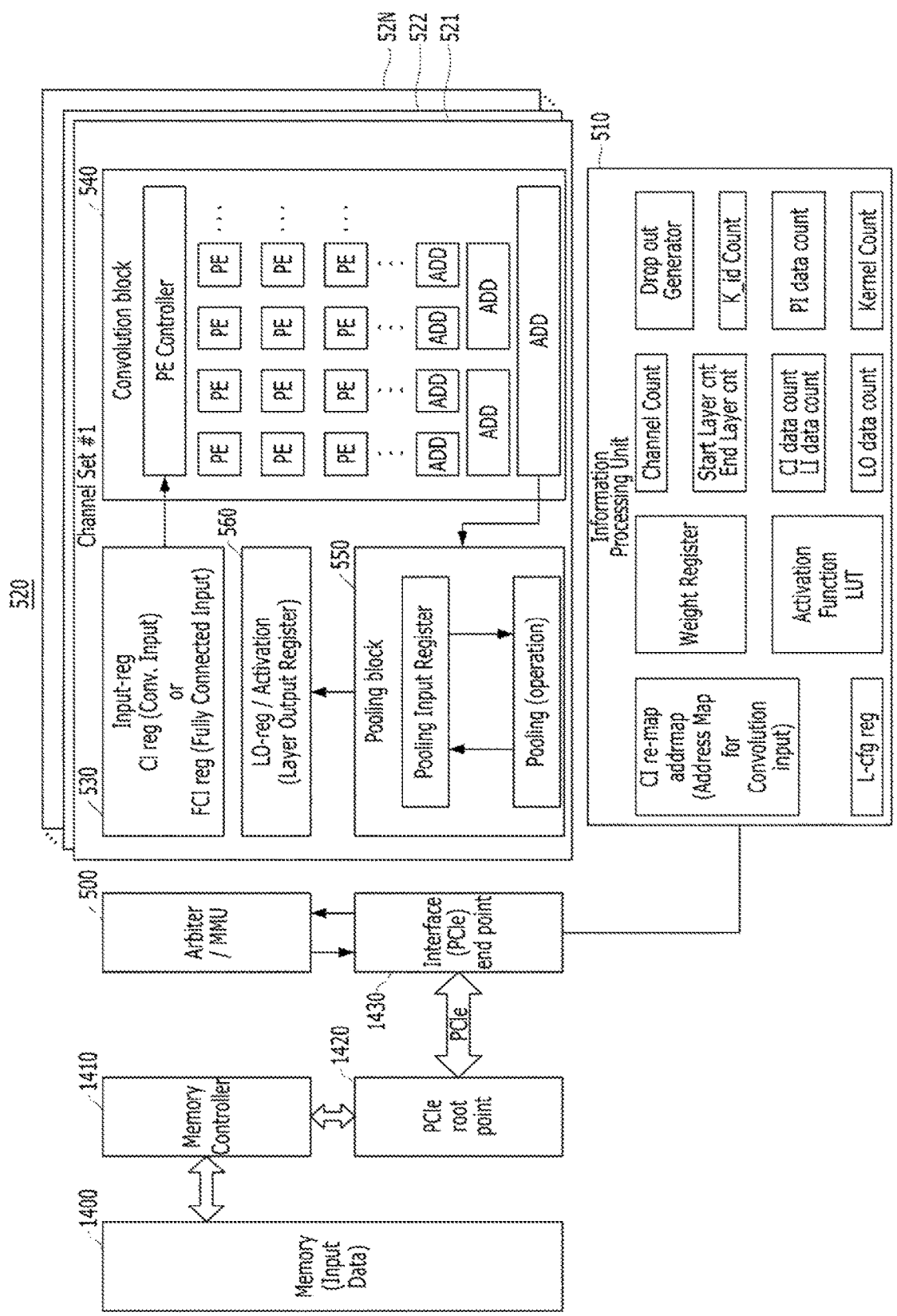
FIG. 14 is a diagram showing another exemplary configuration of a convolution neural network (CNN) system, in accordance with various embodiments of the present invention.

FIG. 14 is a diagram showing another exemplary configuration of the CNN system, in accordance with various embodiments of the present invention.

Referring to FIG. 14, the CNN system may include the CNN control unit 500, the information processing unit 510, the input unit 530, the convolution block 540, the pooling block 550, the output unit 560, a memory 1400, a memory controller 1410, a peripheral component interconnect express (PCIe) root point 1420 and an interface (PCIe) end point 1430.

The memory 1400 may store data on which a deep learning algorithm will be performed. The memory controller 1410 may control the operation of the memory 1400. For example, the memory controller 1410 may control the read and write operations of the memory 1400 and provide input data to the CNN operation apparatus. The memory controller 1410 may be the controller of a host. The host may be an electronic device. The PCIe root point 1420 and the PCIe end point 1430 may perform an interfacing operation that satisfies the standards of the PCIe. The PCIe is an interface of a series architecture for input/output. The PCIe may be an interface having a relatively high system bus bandwidth, a relatively small number of input/output (I/O) pins, a relatively small physical area, the scalability performance of bus devices, and an error detection and report structure. The PCIe root point 1420 and the PCIe end point 1430 may provide an interface function between the memory controller 1410 and the CNN operation apparatus. For example, the PCIe root point 1420 and the PCIe end point 1430 may execute a data interface operation between the CNN operation apparatus and the memory controller 1410. For example, when a system is initialized, the memory controller 1410 may provide information, such as, for example, weight data, an address map, layer configuration information, a look-up table and/or drop-out information, for performing a deep learning algorithm from the host to the CNN operation apparatus through the PCIe root point 1420 and the PCIe end point 1430. Furthermore, the CNN operation apparatus may provide the learning results of channel data to the memory controller 1410 through the PCIe root point 1420 and the PCIe end point 1430.

The CNN operation apparatus may include the CNN control unit 500, the information processing unit 510, the input unit 530, the convolution block 540, the pooling block 550 and the output unit 560. The CNN operation apparatus may have the same configuration and operation as the apparatus of FIG. 5.

As shown in FIG. 3, the CNN operation apparatus in accordance with various embodiments of the present invention may perform a feature extraction layer operation 320 on the input data of all of channels after performing an initialization operation 310. When the feature extraction layer operation 320 is completed, the CNN operation apparatus may perform a classification layer operation 330. When the classification layer operation 330 is completed, the CNN operation apparatus may send a learnt result value to the host.

Figure 15A:
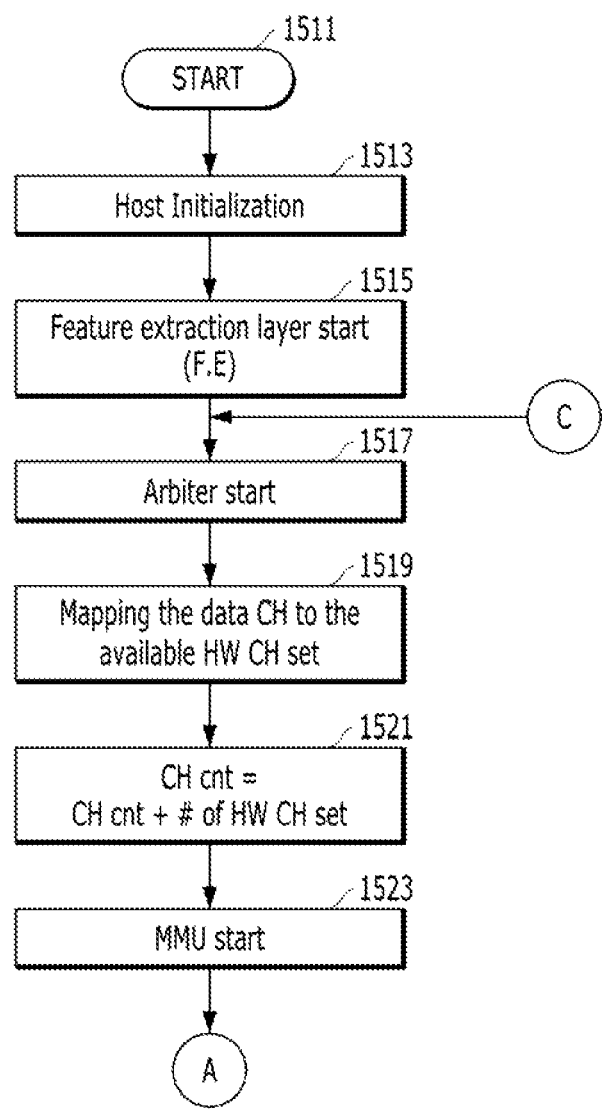
FIGS. 15A to 15C are flowcharts illustrating an exemplary operation of a convolution neural network (CNN) operation apparatus, in accordance with various embodiments of the present invention.
Figure 15B:
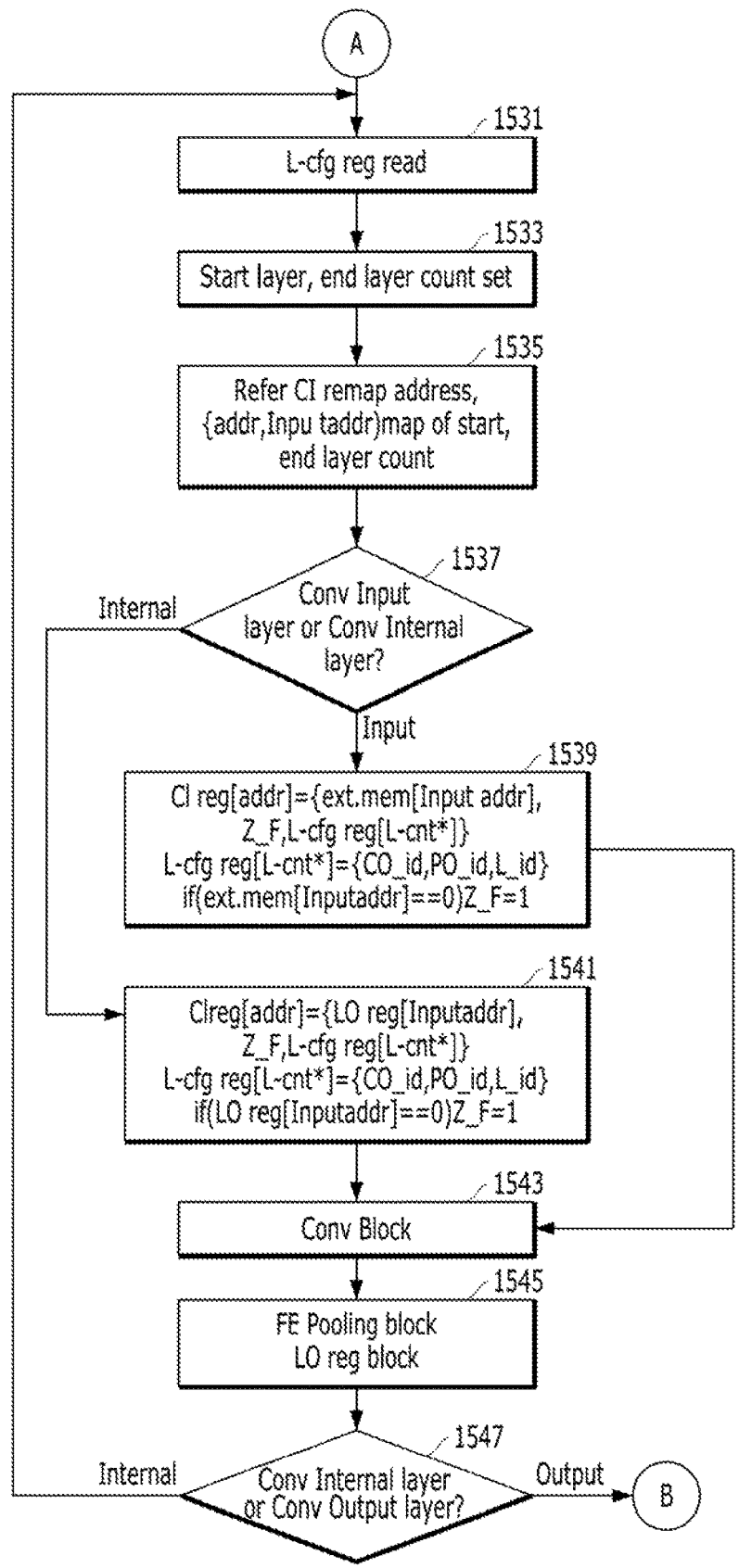
Figure 15C:
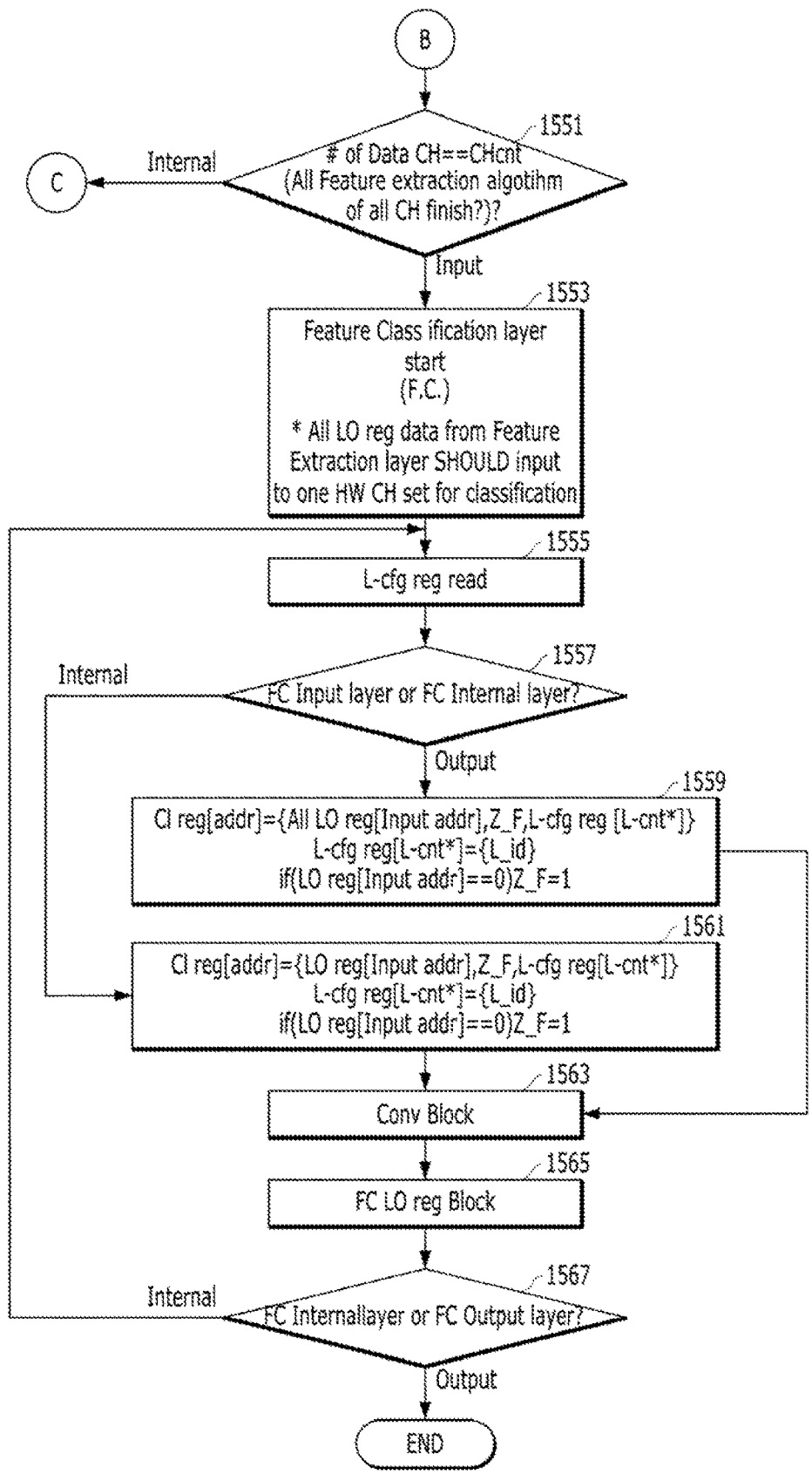

FIGS. 15A to 15C are flowcharts illustrating an exemplary operation of a convolutional neural network (CNN) operation apparatus in accordance with various embodiments of the present invention. FIGS. 15A to 15C may correspond to an operation of the CNN control unit 500 of the CNN operation apparatuses illustrated in FIGS. 5 and 14.

Referring to FIGS. 15A to 15C, at step 1511, the operation of the CNN operation apparatus may start. When the operation of the CNN operation apparatus starts, the CNN operation apparatus may perform a host initialization operation at step 1513. In the host initialization operation, the host may send information (i.e., initialization information) to be used in a feature extraction layer operation and a configuration layer operation to the CNN operation apparatus. The CNN operation apparatus may store pieces of the received initialization information in registers of the information processing unit 510. In the initialization operation, the information processing unit 510 may store weight data sets in the weight register 512, may store CI re-map address map information in the address map register 511, may store layer configuration information in the L cfg register 513, and may store an activation function look-up table in the activation function register 514.

After performing the initialization operation, the CNN operation apparatus may start a feature extraction layer operation at step 1515 and may start the operation of the arbiter of the CNN control unit 500 at step 1517. At step 1519, the CNN operation apparatus may map a data channel to an available channel hardware set 520. At step 1521, the CNN operation apparatus may set the channel counter 501. The value of the channel counter 501 may be set as (a CH count+the number of channel hardware sets). After setting the channel count, the CNN operation apparatus may start the operation of the MMU of the CNN control unit 500 at step 1523 and may start a feature extraction layer operation.

When the feature extraction layer operation is started, the CNN operation apparatus may check a layer configuration with reference to the L cfg register 513 at step 1531 of FIG. 15B, and may set the value of the start layer counter/end layer counter 502 at step 1533. The value of the start layer counter/end layer counter 502 may be transferred to the convolution block 540 so that the convolution block 540 prefetches a weight data set corresponding to the value of the start layer counter/end layer counter 502 stored in the weight register 512. At step 1535, the CNN operation apparatus may map the addresses of the LO register of the output unit 560 and the CI register of the input unit 530 (i.e., {addr, input addr} map of start, end layer count) with reference to the information of the address map 511.

Thereafter, at step 1537, the CNN operation apparatus may check the input data of the feature extraction layer. As shown in FIG. 1, the feature extraction layer may include pairs of a convolution layer and a pooling layer, and may learn the input data through a plurality of feature extraction layer operations. In this case, if, as a result of the check at step 1537, it is found that the input data is the input data of a first feature extraction layer (i.e., the input data of a convolution input layer), at step 1539, the CNN operation apparatus may recognize the input data, may remap data received from an external system, and may store the remapped data in the CI register of the input unit 530. In this case, the address of the CI register may be determined as follows. If the input data is 0, the CNN operation apparatus may set the Z_F of the input data.

CIreg[addr]={ext.mem[Input addr],Z_F,L cfg reg[L-cnt*]}

L cfg reg[L-cnt*]={CO_id,PO_id,L_id} if(ext.mem[Input addr]==0 Z_F=1

The CNN operation apparatus may remap the result value of a previous feature extraction layer and apply the remapped value as the input data of a next feature extraction layer. Accordingly, if the input data is input data (i.e., the input data of a convolution internal layer) after a second feature extraction layer at step 1537 (i.e., internal data), at step 1541, the CNN operation apparatus may recognize the input data, may remap the result value of a previous feature extraction layer, and may store the remapped value in the CI register of the input unit 530. In this case, the address of the CI register may be determined as follows.

CIreg[addr]={LO reg[Input addr],Z_F,L cfg reg[L-cnt*]}

L cfg reg[L-cnt*]={CO_id,PO_id,L_id} if(LO reg[Input addr]==0 Z_F=1

The input data stored in the input unit 530 may have an architecture, such as that of FIG. 6. Thereafter, the CNN operation apparatus may perform a convolution operation on the input data stored in the input unit 530 and weight data prefetched from the information processing unit 510 at step 1543, and may perform pooling operation on the result value of the convolution operation at step 1545. A convolution computation operation may be performed using a method, such as that of FIGS. 16A and 16B. A pooling computation operation may be performed using a method, such as that of FIGS. 17A and 17B.

After performing the pooling operation, at step 1547, the CNN operation apparatus may check whether a currently processed feature extraction layer is the last feature extraction layer. If, as a result of the check, it is found that the currently processed feature extraction layer is not the last feature extraction layer (or an internal layer), the CNN operation apparatus may determine that a next feature extraction layer is present, may return to step 1531, and may perform a computation operation on the next feature extraction layer. In contrast, if, as a result of the check at step 1547, it is found that the currently processed feature extraction layer is the last feature extraction layer (or an output layer), the CNN operation apparatus may recognize the last feature extraction layer, and may check whether a feature extraction layer operation for the input data of all of channels has been completed at step 1551 of FIG. 15C. For example, it is assumed that the CNN operation apparatus includes 3 channel hardware sets and can process the input data of 5 channels. The CNN operation apparatus may perform a feature extraction layer operation on the input data of 3 of the 5 channels. When the feature extraction layer operation for the input data of the 3 channels is terminated, the CNN operation apparatus may continue to perform a feature extraction layer operation on the input data of the remaining 2 channels. Accordingly, if a feature extraction layer operation for the input data of a channel hardware set has been terminated at step 1551, but a feature extraction layer operation for the input data of all of channels has not been completed, the CNN operation apparatus may recognize that a feature extraction layer operation for the input data of all of the channels has not been completed, may return to step 1517 of FIG. 15A, and may perform a feature extraction layer operation on the input data of other channels.

If a feature extraction layer operation for the input data of all of the channels has been completed at step 1551, the CNN operation apparatus may recognize that the feature extraction layer operation for the input data of all of the channels has been completed at step 1551, and may start a classification layer operation at step 1553. The classification layer operation may be performed through a single channel hardware set. That is, the data of all of LO registers from a feature extraction layer should be inputted to a single hardware set for classification. When the classification layer operation starts, the CNN operation apparatus may read layer configuration information from the L cfg register 513 at step 1555 and may set the start layer count/end layer counter 502.

Thereafter, the CNN operation apparatus may check an FC layer at step 1557. Input data in the case of a first FC layer (i.e., an FC input layer) may be the final result value of a feature extraction layer operation. An FC layer subsequent to a second FC layer may be the result value of a previous FC layer operation. In the case of a first FC layer, if the CNN operation apparatus may recognize the first FC layer at step 1557, at step 1559, the CNN operation apparatus may remap the input data of the first FC layer as follows, and may store the remapped data in the input unit 530. In this case, if the input data is 0, the CNN operation apparatus may set the Z_F of the input data.

CIreg[addr]={All LO reg[Input addr],Z_F,L cfg reg [L-cnt*]}

L cfg reg[L-cnt*]={L_id} if(LO reg[Input addr]==0 Z_F=1

Furthermore, if a corresponding FC layer is an FC layer subsequent to a second FC layer, and the CNN operation apparatus may recognize the corresponding FC layer at step 1557, at step 1561, the CNN operation apparatus may remap the input data of the corresponding FC layer as follows, and may store the remapped data in the input unit 530. In this case, if the input data is 0, the CNN operation apparatus may set the Z_F of the input data.

CIreg[addr]={LO reg[Input addr],Z_F,L cfg reg[L-cnt*]}

L cfg reg[L-cnt*]={L_id} if(LO reg[Input addr]==0 Z_F=1

The input data stored in the input unit 530 may have an architecture, such as the FC layer input data set 1211 of FIG. 12. After remapping the input data, the CNN operation apparatus may perform a convolution computation operation on the input data at step 1563. The convolution computation operation may be performed using a method, such as that of FIGS. 16A and 16B. In a classification layer operation, a pooling operation may not be performed. Accordingly, when the convolution computation operation is completed, the CNN operation apparatus may store the result value of the convolution operation in the LO register of the output unit 560 at step 1565.

After performing the FC layer operation, the CNN operation apparatus may check whether a currently processed FC layer is an internal layer or an output layer at step 1567. The CNN operation apparatus may check whether a currently processed FC layer is an FC output layer with reference to the values the start layer counter 502, the end layer counter 502 and the kernel counter 507. If, as a result of the check, it is found that the current processed FC layer is an internal layer, the CNN operation apparatus may return to step 1555 and perform a next FC layer operation. If, as a result of the check, it is found that the current processed FC layer is an output layer, the CNN operation apparatus may terminate its operation and may send the learnt result value to the host.

Figure 16A:
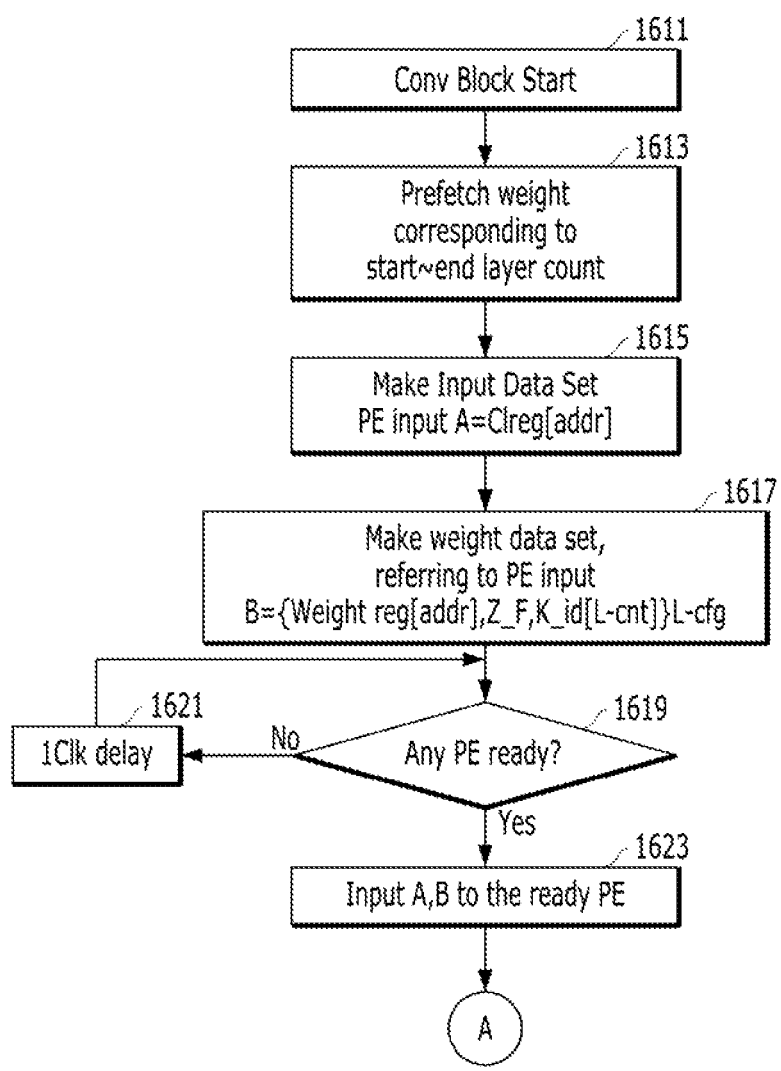
FIGS. 16A and 16B are flowcharts illustrating an exemplary convolution layer operation performed by a convolution neural network (CNN) operation apparatus, in accordance with various embodiments of the present invention.
Figure 16B:
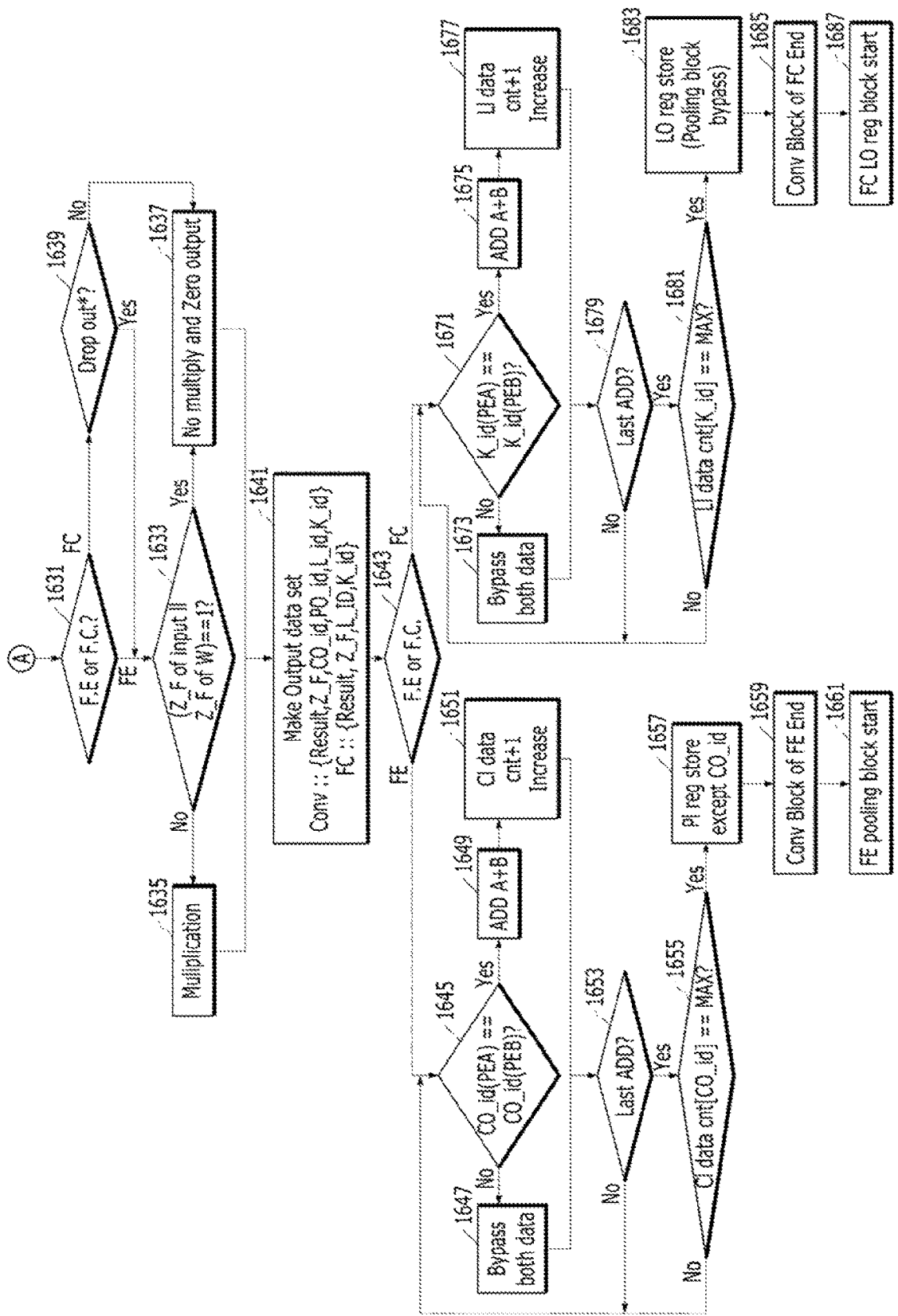

FIGS. 16A and 16B are flowcharts illustrating an exemplary convolution layer operation performed by a CNN operation apparatus in accordance with various embodiments of the present invention.

Referring to FIGS. 16A and 16B, the convolution layer operation may be performed using different methods in a feature extraction layer and a classification layer. The CNN operation apparatus may start the convolution layer operation at step 1611. The CNN operation apparatus may prefetch weight data on which convolution operation is to be performed along with input data at step 1613. The PE controller 543 of the convolution block 540 may prefetch the weight data, corresponding to the value of the start layer counter/end layer counter 502, from the weight register 512. The CNN operation apparatus may configure an input data set including a Z_F, a CO_id, a PO_id and an L_d, such as the input data set of FIG. 6 (or the input data set 911 of FIG. 9A), at step 1615, and may configure a weight data set including weight data, a Z_F and a K_id, such as the weigh data set 913 of FIG. 9A, at step 1617. Furthermore, in the case of a classification layer, the input data set may have the same architecture as the FC layer input data set 1211 of FIG. 12, and the weight data set may have the same architecture as the FC layer weight data set 1213 of FIG. 12. The input data may be the first input (PE input A=CIreg[addr]) of the convolution block 540 as shown in the step 1615. The weight data set may be the second input (PE input B={Weight reg[addr], Z_F, K_id[L-cnt]}) of the convolution block 540 as shown in the step 1617. The CNN operation apparatus may check whether there is a ready PE (i.e., a PE capable of convolution operation, an empty PE) at step 1619. If, as a result of the check, it is found that a ready PE is not present, the CNN operation apparatus may wait until a PE is ready at step 1621. If, as a result of the check at step 1619, it is found that a ready PE is present, the CNN operation apparatus may recognize the ready PE and input the input data and the weight data to the ready PE at step 1623.

The convolution block 540 may operate in both a feature extraction layer and a classification layer. If, as a result of the check at step 1631 of FIG. 16B, it is found that an operation that is now being executed is a feature extraction layer operation (FE of the step 1631), the CNN operation apparatus may recognize the feature extraction layer operation and analyze the Z_F of the input data or weight data at step 1633. At this time, if the ZF is a set state, the CNN operation apparatus may recognize that the ZF is a set state at step 1633 (Yes), and output zero data without performing convolution multiplication operation at step 1637. Furthermore, if the ZF of the input data or weight data is a reset state at step 1633 (No), the CNN operation apparatus may recognize that the ZF of the input data or weight data is a reset state and perform convolution multiplication operation at step 1635. For example, the convolution multiplication operation may be performed through a PE having a architecture, such as that of FIG. 8A. The operation of the PE is described below. The multiplier 810 may multiply the input data and the weight data. The selector 830 may receive the output of the multiplier 810 and zero data. In this case, when the ZF of the input data or the weight data is a set state, the selector 830 may select and output the zero data. Only when both the Z_Fs of the input data and the weight data are a reset state, the selector 830 may select the output of the multiplier 810. Thereafter, the CNN operation apparatus may generate the result data set (Conv: {Result, Z_F, CO_id, PO_id, L_id, K_id}) of the convolution multiplication operation for the feature extraction layer at step 1641. The result data set of the convolution multiplication operation for the feature extraction layer may have an architecture, such as the result data set 915 of FIG. 9A.

Furthermore, if, as a result of the check at step 1631, it is found that the operation that is now being executed is a classification layer operation (FC of the step 1631), the CNN operation apparatus may recognize the classification layer operation and check whether a PE is to be dropped out at step 1639. Such drop-out may be determined by the drop-out generator 515. For example, the CNN operation apparatus may drop out 50% of the PEs of the PE unit 545. If, as a result of the check at step 1639, it is found that a PE is to be dropped out (No of the step 1639), the CNN operation apparatus may recognize that a PE is to be dropped out, and may output the zero data without performing convolution multiplication operation at step 1637. In contrast, if, as a result of the check, it is found that a PE is to be not dropped out (Yes of the step 1631), the CNN operation apparatus proceeds to step 1633 and may analyze the ZF of the input data or the weight data. At this time, if the Z_F is a set state at step 1633, the CNN operation apparatus may recognize that the Z_F is a set state (Yes) and output the zero data without performing convolution multiplication operation at step 1637. Furthermore, if the ZF is a reset state at step 1633, the CNN operation apparatus may recognize that the ZF is a reset state (No) and perform convolution multiplication operation at step 1635. For example, the convolution multiplication operation may be performed through a PE having a architecture, such as that of FIG. 8B. The operation of the PE is described below. The multiplier 810 may multiply the input data and the weight data. The selector 830 may receive the output of the multiplier 810 and zero data. In this case, when a drop-out signal is received or the Z_F of the input data or the weight data is a set state, the selector 830 may select and output the zero data. Only when a drop-out signal is not received and both the ZF_s of the input data and the weight data are a reset state, the selector 830 may select the output of the multiplier 810. Thereafter, the CNN operation apparatus may generate the result data set (FC::{Result, Z_F, L_id, K_id}) of the convolution multiplication operation for the classification layer at step 1641. The result data set of the convolution multiplication operation for the classification layer may have an architecture, such as the FC layer result data set 1215 of FIG. 12.

If, as a result of the check at step 1643, it is found that the operation that is now being executed is a feature extraction layer operation (FE of the step 1643), the CNN operation apparatus may recognize the feature extraction layer operation, may analyze the PO_ids of the result data sets of the convolution multiplication operation output by PEs (e.g., a PE A and a PE B), such as the result data set 915 of FIG. 9A, and may perform an addition operation. To this end, when the CNN operation apparatus recognizes that the CO_id of the PE A is identical with the PO_id of the PE B at step 1645, it may add the outputs of the PE A and the PE B together at step 1649 and increase the value of the CI data counter 503 by 1 at step 1651. If, as a result of the check at step 1645, it is found that the CO_Id of the PE A is different from the PO_id of the PE B, the CNN operation apparatus may recognize such a difference and bypass an addition operation at step 1647. Thereafter, the CNN operation apparatus checks whether an addition is the last addition at step 1653.

If, as a result of the check, it is found that the addition is not the last addition (No of the step 1653), the CNN operation apparatus may return to step 1645 and continue to perform an addition operation. If, as a result of the check, it is found that the addition is the last addition at step 1653 (Yes), the CNN operation apparatus may check whether an accumulated value is a maximum value (i.e., CI data cnt[CO_id]==MAX) of the CI data count 503 at step 1655. In this case, if, as a result of the check, it is found that the accumulated value is not a maximum value (e.g., an input data set, such as the input data set 963 of FIG. 9C) (No of the step 1655), the CNN operation apparatus may return to step 1645 and continue to perform an addition operation. If, as a result of the check, it is found that the accumulated value is a maximum value (Yes of the step 1655), the CNN operation apparatus may remove the CO_id at step 1657 and store the corresponding result value (e.g., an input data set, such as the input data set 961 of FIG. 9C) in the PI register of the pooling block 550. Thereafter, the CNN operation apparatus may terminate the convolution layer operation at step 1659 and start a pooling layer operation at step 1661.

If, as a result of the check at step 1643, it is found that the operation that is now being executed is a classification layer operation (FC), the CNN operation apparatus may recognize the classification layer operation, may analyze K_ids in the result data sets of the convolution multiplication operation output by PEs (e.g., a PE A and a PE B), such as the result data set 1215 of FIG. 12, and may perform an addition operation. To this end, when the CNN operation apparatus recognizes that the CO_id of the PE A is identical with the K_id of the PE B at step 1671 (Yes), it may add the outputs of the PE A and the PE B together at step 1675 and increase the value of the LI data counter 503 by 1 at step 1677. If, as a result of the check at step 1671, it is found that the K_id of the PE A is different from the K_id of the PE B (No), the CNN operation apparatus may recognize such a difference and bypass an addition operation at step 1673. Thereafter, the CNN operation apparatus may check whether an addition is the last addition at step 1679. If, as a result of the check, it is found that the addition is not the last addition (No of the step 1679), the CNN operation apparatus may return to step 1671 and continue to perform an addition operation. If, as a result of the check at step 1679, it is found that the addition is the last addition (Yes of the step 1679), the CNN operation apparatus may check whether an accumulated value is a maximum value (i.e., LI data cnt[K_id]==MAX) of the LI data counter 503 at step 1681. If, as a result of the check, it is found that the accumulated value is not a maximum value (No of the step 1681), the CNN operation apparatus may return to step 1671 and continue to perform an addition operation. If, as a result of the check at step 1681, it is found that the accumulated value is a maximum value (Yes), the CNN operation apparatus may store a corresponding result value in the LO register of the output unit 560 at step 1683. Thereafter, the CNN operation apparatus may terminate the convolution layer operation at step 1685 and start the operation of the output unit 560 (i.e., start an FC LO register block) at step 1687. The start of the FC LO register block may be performed using a method, such as that of FIG. 18.

Figure 17A:
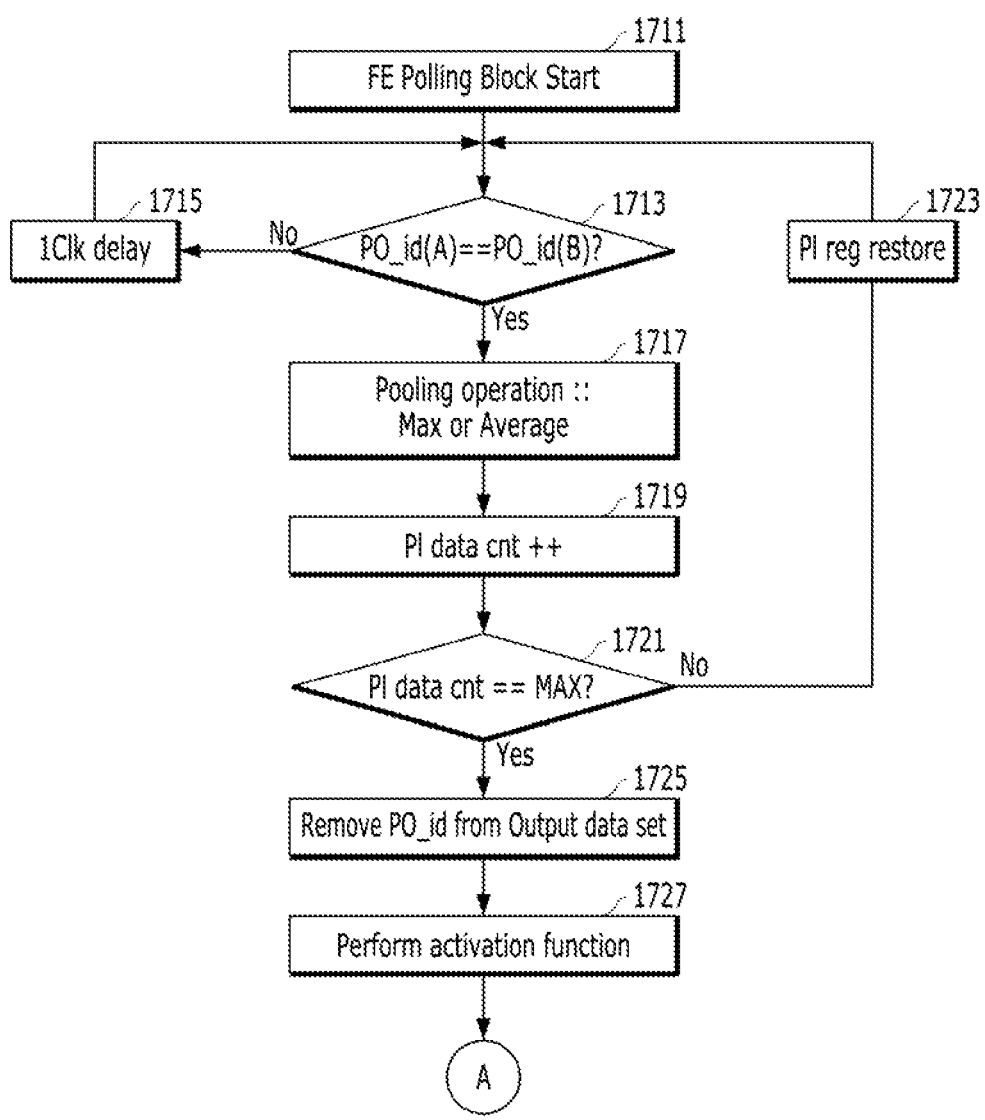
FIGS. 17A and 17B are flowcharts illustrating an exemplary pooling layer operation in a convolution neural network (CNN) operation apparatus, in accordance with various embodiments of the present invention.
Figure 17B:
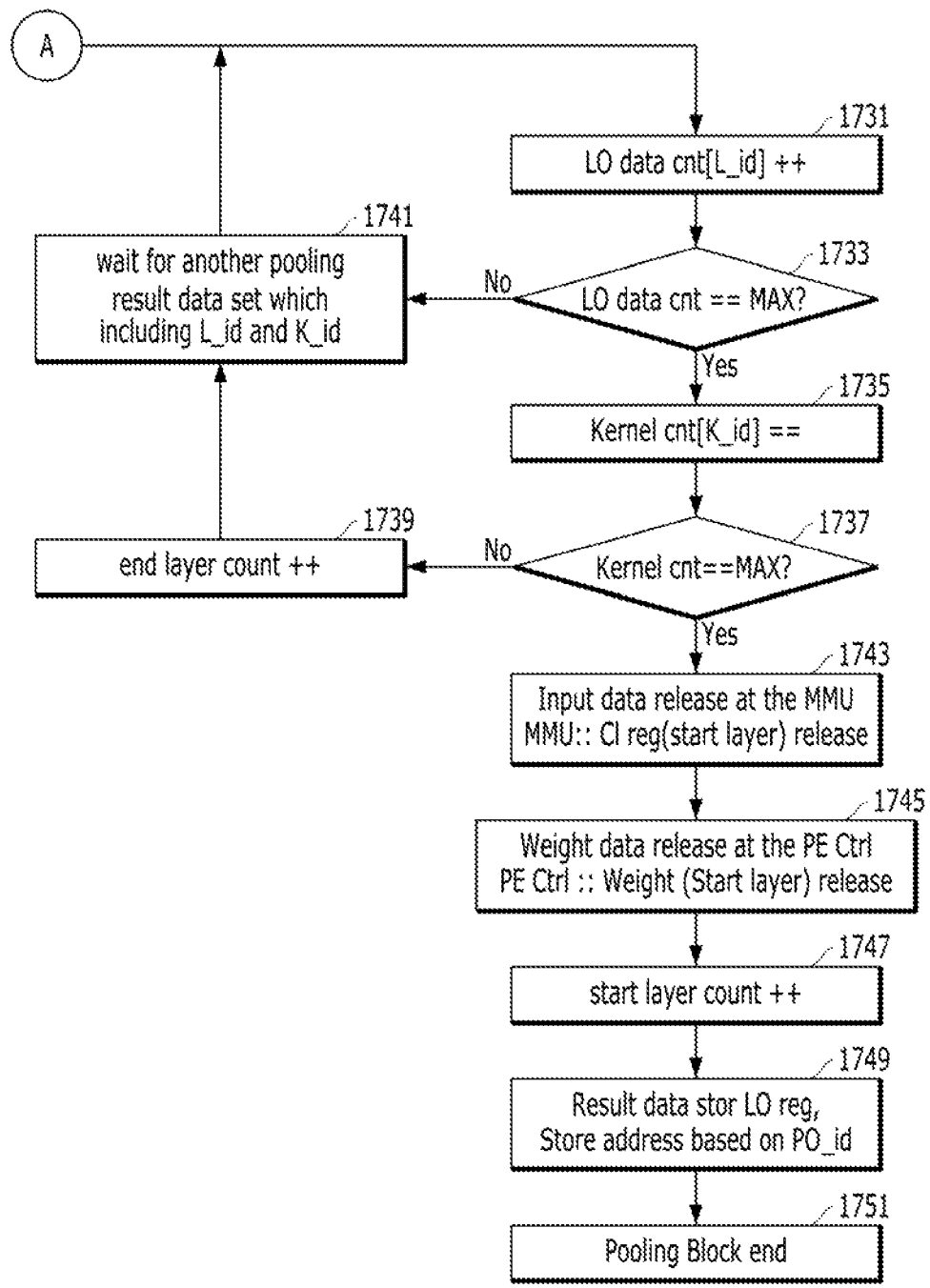

FIGS. 17A and 17B are flowcharts illustrating an exemplary pooling layer operation in a convolutional neural network (CNN) operation apparatus in accordance with various embodiments of the present invention.

Referring to FIGS. 17A and 17B, the CNN operation apparatus may start a pooling computation operation for a feature extraction layer at step 1711. A data set stored in the PI register 555 may have an architecture, such as that of FIG. 10. When the pooling operation starts, the CNN operation apparatus may search the PI register 555 for data having the same PO_id. In this case, if the PO_ids of data are not the same at step 1713 (No), the CNN operation apparatus may proceed to step 1715 and wait. If the PO_ids of data are the same (e.g., PO_id(A)=PO_id(B)) at step 1713 (Yes), the CNN operation apparatus may recognize that the PO_ids are the same and perform the pooling operation at step 1717. In this case, the pooling operation may be a method for selecting data that belongs to two data and that has a greater value or calculating an average value of the two data. After performing the pooling operation, the CNN operation apparatus may check whether a value of the PI data counter 506 is a maximum value at step 1721. If, as a result of the check, it is found that the value of the PI data counter 506 is not a maximum value (No of the step 1721), the CNN operation apparatus may store the value of the pooling operation in the PI register at step 1723 and proceed to step 1713. If, as a result of the check at step 1721, it is found that the value of the PI data counter 506 is a maximum value (Yes of the step 1721), the CNN operation apparatus may remove a PO_id from the data set on which the pooling operation has been performed at step 1725, may perform an activation function on the data on which the pooling operation has been performed with reference to the activation function LUT 514 at step 1727, and may store corresponding data in the LO register of the output unit 560.

The CNN operation apparatus may increase the value of the LO data counter 504 corresponding to the L_id of the corresponding data by 1 at step 1731 of FIG. 17B, and may check whether the value of the LO data counter 504 is a maximum value at step 1733. If, as a result of the check, it is found that the value of the LO data counter 504 is not a maximum value (No of the step 1733), the CNN operation apparatus may wait until the result value of the pooling operation is received at step 1741. That is, the CNN operation apparatus may wait for another pooling result data set including an L_id and a K_id. If, as a result of the check at step 1733, it is found that the value of the LO data counter 504 is a maximum value (Yes of the step 1733), the CNN operation apparatus may increase the value of the kernel counter 507 at step 1735 and check whether a value of the kernel counter 507 is a maximum value at step 1737. If, as a result of the check, it is found that the value of the kernel counter 507 is not a maximum value (No of the step 1737), the CNN operation apparatus may increase the value of the end layer count at step 1739 and proceed to step 1741.

If, as a result of the check at step 1737, it is found that the value of the kernel count 507 is a maximum value (Yes of the step 1737), the CNN operation apparatus may release the input data (i.e., MMU::CI reg (start layer) release) at step 1743 and release the weight data (i.e., PE Ctrl::Weight (start layer) release) at step 1745. Thereafter, the CNN operation apparatus may increase the value of the start layer counter 502 at step 1747 and store the result data in the LO register of the output unit 560 (or store a corresponding address based on a PO_id) at step 1749. Thereafter, the CNN operation apparatus may terminate the pooling operation at step 1751.

Figure 18:
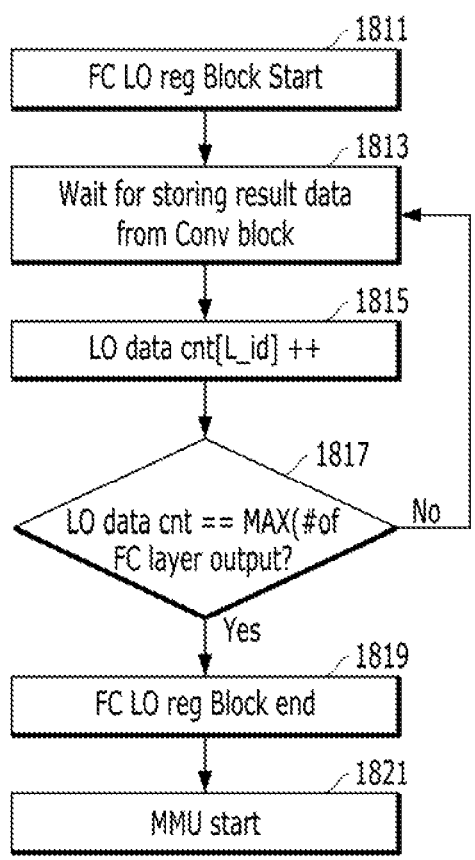
FIG. 18 is a flowchart illustrating an exemplary classification layer output operation of the convolution neural network (CNN) operation apparatus, in accordance with various embodiments of the present invention.

FIG. 18 is a flowchart illustrating an exemplary classification layer output operation of a convolutional neural network (CNN) operation apparatus, in accordance with various embodiments of the present invention.

Referring to FIG. 18, when the output operation of an FC layer starts (i.e., an LO register block starts) at step 1811, the CNN operation apparatus may wait for the reception of convolution operation result data at step 1813. When data is received from the convolution block, the CNN operation apparatus may increase the value of the LO data counter 504 by 1 at step 1815 and check whether a value of the LO data counter 504 is a maximum value (i.e., LO data cnt==MAX (#of the FC layer output)) at step 1817. If, as a result of the check, it is found that the value of the LO data counter 504 is not a maximum value (No of the step 1817), the CNN operation apparatus may return to step 1813 and wait for a next input. If, as a result of the check at step 1817, it is found that the value of the LO data counter 504 is a maximum value (Yes of the step 1817), the CNN operation apparatus may recognize that the value of the LO data counter is a maximum value, may terminate the output operation at step 1819 (i.e., terminates the FC LO register block), and may start the operation of the MMU of the CNN control unit 500 at step 1821.

The CNN operation apparatus (or deep learning processor accelerator) in accordance with various embodiments of the present invention may be suitable for the parallel processing of a neuromorphic algorithm and may be suitable for performing another deep learning algorithm using the neuromorphic algorithm. Furthermore, the CNN operation apparatus in accordance with various embodiments of the present invention may be used in a processor which performs image recognition, classification and analysis.

In accordance with various embodiments of the present invention, a CNN algorithm may be implemented in a CNN operation architecture form and can execute a test operation at a high speed and with low power. The CNN accelerator in accordance with various embodiments of the present invention can perform a deep learning algorithm even in a portable device because it can operate with low power. The CNN operation architecture in accordance with an embodiment of the present invention can drive CNN algorithms of various sizes through a configuration.

The CNN operation architecture in accordance with an embodiment of the present invention can rapidly perform a deep learning algorithm by performing a zero-pass function. The CNN operation architecture in accordance with an embodiment of the present invention can reduce the time taken to load a weight parameter from memory by prefetching the weight parameter from the convolution block, thus being capable of rapidly performing a deep learning algorithm.

Although various embodiments have been described for illustrative purposes, it will be apparent to those skilled in the art that various changes and modifications may be made without departing from the spirit and scope of the invention as defined in the following claims.

What is claimed is:
1. A convolutional neural network (CNN) operation apparatus, comprising:
at least one channel hardware set configured to perform a feature extraction layer operation and a classification layer operation based on input data and weight data;
a control circuit coupled to the at least one channel hardware set, and configured to control the at least one channel hardware set to perform the feature extraction layer operation and perform the classification layer operation when the feature extraction layer operation is completed; and
an information processing unit including a weight register for storing the weight data and an address map register which receives an address map from an external system, wherein each of the at least one channel hardware set comprises:
an input unit configured to store the input data;
a convolution block configured to perform convolution operation on the input data and the weight data;
a pooling block configured to perform pooling operation on a convolution output value on which the convolution operation has been performed; and
an output unit configured to output the convolution output value or the data on which the pooling operation has been performed,
wherein the convolution block comprises:
a plurality of process element circuits each configured to receive input data and weight data and perform a multiplication operation on the received input data and the received weight data;
a plurality of adders configured to add result values calculated by the process element circuits and have a same convolution output identification (COID) together;
an accumulation block configured to accumulate the added result values having the same COID and output the accumulated value to the pooling block when a number of the result values having the same COID reaches a maximum value; and
a process element circuit controller configured to input the input data of the input unit and the weight data of the weight register to a ready process element circuit among the plurality of process element circuits,
wherein, under control of the controller circuit, the pooling operation is performed on two or more completed convolution output values among the convolution output values while performing the convolution operation on uncompleted convolution output values among the convolution output values;
wherein the address map is in each layer and includes address mapping information for mapping the input data to the weight data for a first layer, and remapped address mapping information received from the control circuit which maps an address of a layer output register of the output unit to an address of a layer input register of the input unit for subsequent layers.

2. The operation apparatus of claim 1, wherein the control circuit controls the convolution block and pooling block to perform a convolution layer operation and a pooling layer operation in the feature extraction layer operation.

3. The operation apparatus of claim 2, wherein the control circuit performs the classification layer operation when the feature extraction layer operation is terminated and controls the convolution block to perform a fully connected layer operation in the classification layer operation.

4. The operation apparatus of claim 1, wherein the process element circuit controller checks values of start and end layer counts, prefetches corresponding weight data from the weight register based on the values of start and end layer counts, and inputs the input data and the prefetched weight data to the ready process element circuit.

5. The operation apparatus of claim 3, wherein:
the control circuit checks a current layer configuration of data stored in an output register, accesses data of the address map register, and outputs the accessed data to the input unit.

6. The operation apparatus of claim 1, wherein the address map is received from the external system in an initialization state.

7. The operation apparatus of claim 3, wherein:
the control circuit sets a zero flag of the input data when the input data is 0 and stores the zero-padded input data in the input unit, and
the convolution block omits convolution multiplication operation for input data whose zero flag has been set.

8. The operation apparatus of claim 7, wherein each of the plurality of the process element circuits comprises:
a multiplier configured to multiply the input data and the weight data;
a logical gate configured to perform logical operation on the input data and the weight data; and
a selection circuit configured to select an output data of the multiplier or zero data based on an output of the logical gate and outputting the selected data,
wherein the selection circuit is configured to select the zero data if the input data or the weight data is a zero flag.

9. The operation apparatus of claim 8, wherein the control circuit sets the zero flag when the weight data is 0 and inputs the input data or the weight data to a corresponding process element circuit.

10. The operation apparatus of claim 3, wherein the control circuit checks a value of a channel count after an extraction of features of channel data is completed, assigns input data of remaining channels to the at least one channel hardware set again if the value of the channel count is not a maximum value, and performs the feature extraction layer operation.

11. The operation apparatus of claim 3, wherein the control circuit inputs result data of all channels computed in the feature extraction layer operation to a single channel hardware set when a fully connected layer operation of a classification layer is performed.

12. The operation apparatus of claim 11, wherein:
the information processing unit further comprises a drop-out signal generator configured to provide some of the process element circuits with a drop-out signal for regularizing the convolution output value, and
a process element circuit outputs zero data regardless of input data and weight data when receiving the drop-out signal.

13. The operation apparatus of claim 12, wherein:
the control circuit sets a zero flag of the input data when the input data is 0,
the convolution block comprises a plurality of process element circuits,
each configured to perform convolution multiplication operation on the input data and the weight data, and omit convolution multiplication operation when input data whose zero flag has been set, weight data whose zero flag has been set or the drop-out signal is received.

14. An operating method of a convolutional neural network (CNN), the operating method comprising:
performing a feature extraction layer operation by activating a convolution block and a pooling block of at least one channel hardware set; and
performing a classification layer operation by activating the convolution block of the at least one channel hardware set when the feature extraction layer operation is completed
wherein the performing of the feature extraction layer operation comprises:
storing input data;
performing convolution operation on the input data and weight data;
performing a pooling operation on data on which the convolution operation has been performed; and outputting the data on which the convolution operation has been performed or the data on which the pooling operation has been performed, wherein the performing of the convolution operation comprises:

receiving an address map from an external system;

multiplying the input data and the weight data;

adding the multiplied result values having a same convolution output identification (COID) and calculated by the process element circuits together; and accumulating the added result value of having the same COID for generating a convolution output value, wherein the pooling operation is performed on two or more completed convolution output values among a plurality of convolution output values while performing the convolution operation on uncompleted convolution output values among the plurality of convolution output values; and wherein the address map is in each layer and includes address mapping information for mapping the input data to the weight data for a first layer, and remapped address mapping information received from a control circuit which maps an address of a layer output register of an output unit to an address of a layer input register of an input unit for subsequent layers.

15. The operating method of claim 14, wherein the performing of the convolution operation further comprises:

checking values of start and end layer counts; and prefetching corresponding weight data from a weight register based on the values of start and end layer counts.

16. The operating method of claim 14, wherein the performing of the pooling operation comprises selecting a maximum value of two convolution operation output values.

17. The operating method of claim 14, wherein the performing of the pooling operation comprises calculating an average value of two convolution operation output values.

18. The operating method of claim 14, wherein the storing of the input data comprises:

checking a layer configuration of output data of the pooling operation;

mapping the output data to an address of an address map register based on the checked layer configuration; and storing the output data of the pooling operation as the input data.

19. The operating method of claim 18, further comprising receiving the address map for storing in the address map register from the external system in an initialization state.

20. The operating method of claim 14, wherein:

the storing of the input data comprises setting a zero flag of the input data when the input data is 0, and the performing of the convolution operation comprises omitting multiplication operation for input data whose zero flag has been set.

21. The operating method of claim 20, wherein the performing of the convolution operation comprises:

multiplying the input data and the weight data;

analyzing zero flags of the input data and the weight data;

outputting zero data when the zero flag of the input data or the weight data is a set state; and outputting the multiplying result when the zero flags of the input data and the weight data are a reset state.

22. The operating method of claim 16, wherein the performing of the feature extraction layer operation comprises:

checking a value of a channel count when an extraction of features of channel data is completed; and assigning input data of remaining channels to the channel hardware set again if the value of the channel count is not a maximum value and performing the feature extraction layer operation again.

23. The operating method of claim 14, wherein the performing of the classification layer operation comprises:

inputting result data of all channels extracted from the feature extraction layer into a single channel hardware set;

performing the convolution operation on the input data and the weight data; and outputting the data on which the convolution operation has been performed.

24. The operating method of claim 23, wherein the performing of the convolution operation comprises:

performing, by each of a plurality of process element circuits, convolution multiplication operation on the input data and the weight data for generating the multiplied result value, and omitting, by a process element circuit, the convolution multiplication operation when the drop-out signal is received for regularizing the convolution output value.

* * * * *